US011410541B1

(12) United States Patent
Chung et al.

(10) Patent No.: US 11,410,541 B1
(45) Date of Patent: Aug. 9, 2022

(54) GESTURE-BASED SELECTION OF DEVICES

(71) Applicant: Amazon Technologies, Inc., Seattle, WA (US)

(72) Inventors: Tan Shen Cliff Chung, Seattle, WA (US); Rong Shen, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 121 days.

(21) Appl. No.: 16/908,131

(22) Filed: Jun. 22, 2020

(51) Int. Cl.
*G08C 17/02* (2006.01)
*H04W 4/80* (2018.01)

(52) U.S. Cl.
CPC .............. *G08C 17/02* (2013.01); *H04W 4/80* (2018.02); *G08C 2201/31* (2013.01); *G08C 2201/32* (2013.01)

(58) Field of Classification Search
CPC ............................ G08C 17/02; G08C 2201/91; G08C 2201/92; G08C 2201/30; G08C 2201/31; G08C 2201/32; G08C 2201/42; G08C 2201/70; H04W 4/80; G06F 3/04883
See application file for complete search history.

(56) References Cited

U.S. PATENT DOCUMENTS

| 2012/0169482 A1* | 7/2012 | Chen ..................... G08C 23/04 |
| | | 340/12.52 |
| 2017/0135061 A1* | 5/2017 | Park ........................ H04W 4/02 |
| 2020/0404077 A1* | 12/2020 | Jiang ................... G06F 16/9035 |
| 2021/0272447 A1* | 9/2021 | Tchedikian ......... G06F 3/04883 |

* cited by examiner

*Primary Examiner* — Omeed Alizada
(74) *Attorney, Agent, or Firm* — Eversheds Sutherland (US) LLP

(57) ABSTRACT

Devices, systems, and methods are provided for gesture-based selections of devices. A method may include receiving, by at least one processor of a first device, an input associated with causing a second device to perform an action. The method may include identifying motion data associated with the first device. The method may include determining, based on the motion data, a gesture associated with the first device. The method may include receiving an indicator from the second device and determining, based on the indicator, that the gesture is associated with selecting the second device to perform the action. The method may include sending a command to the second device, the command associated with causing the second device to perform the action.

20 Claims, 13 Drawing Sheets

GESTURE-BASED SELECTION OF DEVICES

BACKGROUND

People increasingly are using a variety of devices to control other devices. Some devices may receive commands from users and control other devices based on those commands. However, some methods for selecting the devices to be controlled based on commands may not account for gestures made by the users, and may not be able to select the correct device to be controlled without a specific voice command identifying the device to be controlled.

Figure 1:
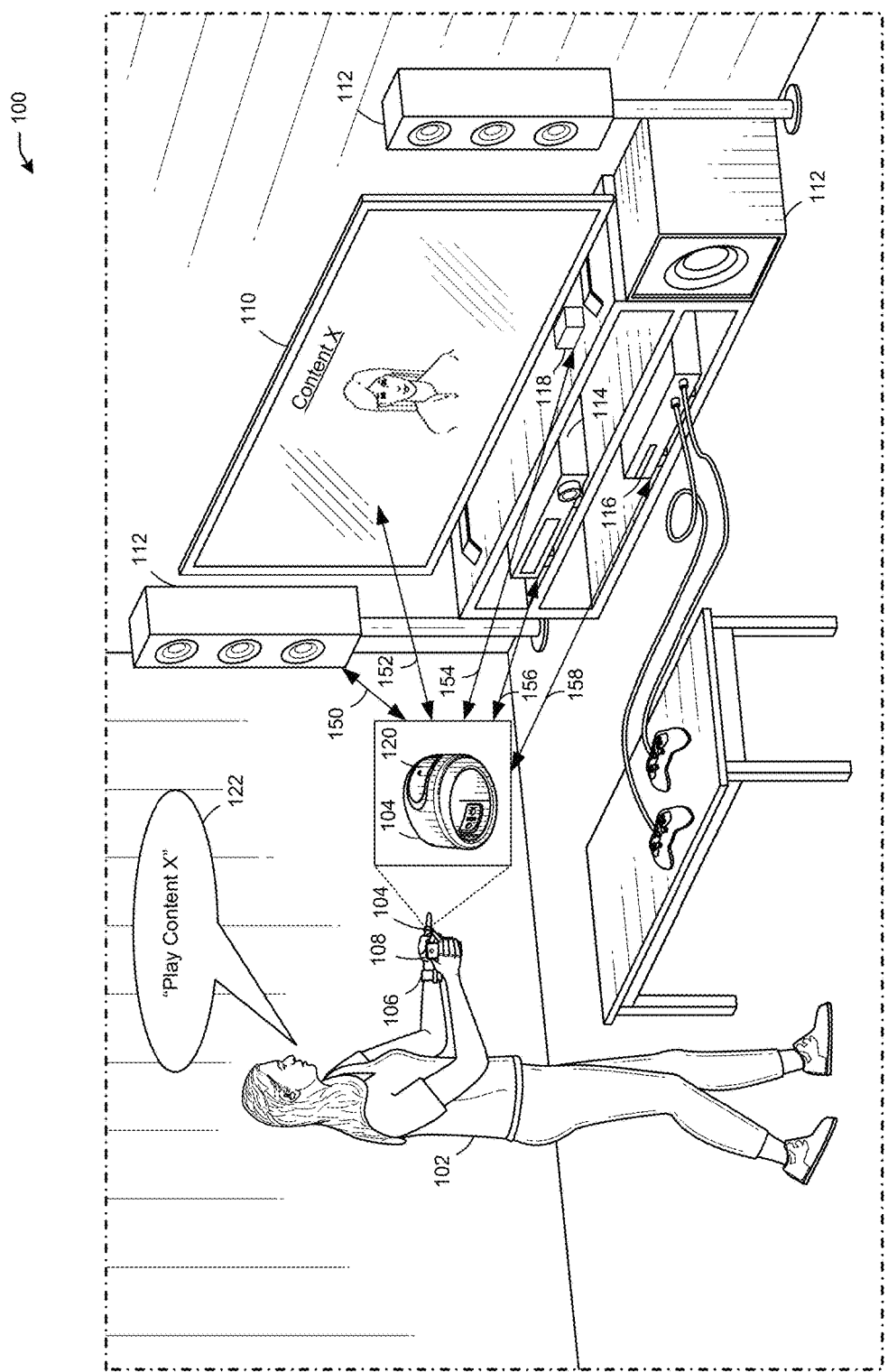
FIG. 1 illustrates an example system for gesture-based selection of devices, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for gesture-based selection of devices.

Device users may use a variety of commands to control devices. For example, device users may use button pushes, voice inputs, gestures, and other inputs that correspond to commands. The commands may be translated into actions performed by the devices. For example, device users may power devices on and off, select content for presentation, select device inputs and settings, and the like by using voice, gesture, and other inputs.

In some situations, device users may have the option to control multiple devices. For example, in a domicile of a device user, the device user may have multiple media and smart devices, such as televisions, stereos, smart home devices, smart phones, laptops, game consoles, streaming media devices, Internet of things (IoT) devices, and the like. When using voice commands to control devices, a device user may indicate (e.g., select) the specific device to perform an action. For example, a voice command of "Turn on the ceiling lights" may identify the specific lights among many lights that may be turned on. Likewise, a voice command of "Play music on the stereo" may identify the specific device among many device with which the device user may play music. A user may provide other commands to select a device to perform an action, such by pointing, clapping, or performing another gesture that may indicate that the user intends a device to perform an action.

In the absence of a specific voice or other selection of the device that the device user intends to control, a voice or other command (e.g., a gesture) may result in control of a device that the device user did not intend to control. For example, a voice command of "Turn on the lights" that does not identify the specific lights (e.g., the ceiling lights) may result in turning on of other lights that the user did not intend (e.g., a desk lamp). A voice command of "Play music" may result in music being played using a device with which the user did not intend to play music. A gesture of pointing to a device may result in the device turning on or off.

Therefore, devices and device users may benefit from gesture-based selection of devices that allow users to specify which devices are intended to perform actions specified in voice or other forms of commands.

In one or more embodiments, gestures made with devices may allow a device user to specify a device to control without the device user having to mention the device to control in a voice command. However, when multiple devices are present and available to perform an action in response to a voice command, the determination of the device to which a gesture is related (e.g., the device which a voice command is intended to control) may need to rely on the direction in which the gesture is made in order to determine that the gesture is indicative of a device being selected. The command may be provided by a voice utterance (e.g., "Turn on the device," etc.), a gesture (e.g., pointing, clapping, etc.). In this manner, a gesture may correspond to a selection of a device to perform an action provided by another input (e.g., a voice command separate from the gesture), or the gesture may correspond to both the action and the device intended to perform the action (e.g., pointing to a light may cause the light to turn on or off).

In one or more embodiments, wireless communications between devices may indicate the distance and direction between devices. For example, Bluetooth Low Energy (BLE) transmissions, such as BLE beacons defined by the IEEE Bluetooth 5.1 technical standard, may indicate an angle of departure (e.g., transmission) and/or angle of arrival (e.g., receipt). A device sending a BLE frame may indicate the angle of departure (e.g., the angle at which the device transmitted the BLE frame). A device receiving a BLE frame may measure the angle at which the device received the BLE frame. Because BLE frames are designed for low-energy applications because they do not require as much information as some Bluetooth frames, BLE frames may be used to facilitate communication between devices to allow for a determination of distance between devices and angles of transmission or reception.

In one or more embodiments, when a device receives a voice input, the device may translate the voice input into one or more commands, or may send the voice input to another device for translation into one or more commands. When the voice input corresponds to (e.g., is intended to) one or more actions to be performed by another device, the device user may indicate in the voice input the device to perform the one or more actions. However, when the voice input does not specify the device to perform the one or more actions, the directionality of BLE frames may be used to determine the device selected to perform the one or more actions. For example, when a device is used to perform a gesture, such as pointing at another device, motion data (e.g., based on device accelerometer data or other motion data) of the device may correspond to the gesture, and based on the distances and/or angles between the gesturing device and other devices available to perform the one or more actions, the gesturing device or another device may determine that the gesture indicates that the one or more actions are to be performed by a device to which the gesturing device is pointing. To determine a device to which a person points or otherwise gestures, the gesturing device or another device may determine the distances and/or angles between the gesturing device and one or more available devices before and after the gesture. When the gesture is indicative of a user pointing to another device to be selected for performance of the one or more actions, the distance between the gesturing device and other available devices before the gesture may increase after the gesture, and the distance between the gesturing device and the selected device before the gesture may decrease after the gesture (e.g., because the gesture results in the person's hand moving toward the device at which the person is pointing). Similarly, the arrival or departure angle of the selected device before the gesture may not change after the gesture (or may change less than the arrival or departure angle of the other available devices from before the gesture to after the gesture). In this manner, the direction associated with the arrival or departure angle may not change, or may change less, for the selected device.

Not all available devices for control may have BLE capabilities, however. In one or more embodiments, such devices may present sounds (e.g., waveforms) at frequencies that device users may not be able to hear, but that other devices, such as a gesturing device, may be able to identify (e.g., using a microphone). The gesturing device may determine the volume (e.g., intensity or amplitude of a waveform) of such sounds before and after a gesture. The sound presented by a device selected by the gesture may increase (e.g., compared to before the gesture) because, for example, the gesturing device may be closer to the selected device after the gesture (e.g., because the device user pointed to the selected device).

In one or more embodiments, when devices available for control may lack BLE capabilities, a device user may indicate a selection of such devices by using one or more gestures. During or after a voice command indicative of a request to cause a device to perform an action, the gesturing device may be used to gesture until the selected device has been confirmed by the device user. For example, the gesturing device may be used to swipe up, down, left, right, etc., which each gesture corresponding to a selection of an available device until the user stops performing such gestures, resulting in the last selected device based on the gestures as the device to perform the one or more actions.

In one or more embodiments, when a device has determined which device (e.g., itself or another device) is to perform an action indicated by a voice input, the device may instruct the selected device to perform the action. When the device is the device intended to perform the action, the device may initiate one or more applications to cause the device to perform the action. When another device is the device intended to perform the action, the device may send one or more commands to the other device indicating to the other device the action to be performed.

In one or more embodiments, multiple devices may coordinate with one another to determine which commands and gestures are to be translated and/or take priority. For example, two users may make gestures indicating selections of devices to perform an action. To avoid conflicting decisions, the devices may indicate to one another the gestures that they have received based on detected motion data. The devices may negotiate which device has priority to translate its gesture into a selection of a device to perform an action, and the device with the higher priority may translate the gesture or send its motion data to another device for gesture translation to select a device to perform the action.

In one or more embodiments, in the absence of a voice command or other type of command that is separate from a gesture, the gesture may represent both a command and the device that a user intends to control with the command. For example, the user may clap or point to a light, which may perform limited corresponding actions, such as to turn on or off. A device may detect the gesture, determine that the gesture corresponds to an action and a device, and may cause the device to perform the action. For example, the device may identify that a gesture is made in the direction of a device (e.g., by pointing to the device), and may determine that the device may perform only one function (e.g., changing a power state from on to off or off to on). Alternatively, the device may identify the most recent command provided by the user, and may determine that the latest gesture corresponds to the same device controlled by the most recent command (e.g., when the most recent command was received within a threshold amount of time so as to be recent). When only one device is determined to be nearby (e.g., based on received beacons, other received signals, or most recent commands), the command indicated by a gesture may map to the one device (e.g., based on an absence of other options).

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example system 100 for gesture-based selection of devices, in accordance with one or more example embodiments of the present disclosure.

Referring to FIG. 1, the system 100 may include a user 102 (e.g., a device user) having or otherwise associated with one or more devices, such as a ring device 104, a watch device 106, and a smartphone device 108 (e.g., smart devices). The user 102 may be near multiple devices that, in addition to the ring device 104, the watch device 106, and the smartphone device 108, may be controlled. For example, in a room with the user 102 may be a display device 110 (e.g., a television or other type of screen), stereo speakers 112, a cable box 114, a game console 116, and a streaming media device 118 (e.g., capable of downloading streaming media content for presentation). The ring device 104 may have one or more input/output devices, such as a button 120 (or touch sensor) that, when touched or otherwise interacted with, may initiate a command mode (e.g., a voice and/or gesture command mode). For example, the user 102 may utter a voice input 122 (e.g., a command to "Play content X"). A microphone of the ring device 104, the watch device 106, and/or the smartphone device 108 may identify the voice input 122 and translate (or use a cloud-based service for translation as discussed with respect to FIG. 3) the voice input 122 into one or more commands that may cause a device to perform one or more actions (e.g., turn on or off, adjust channels, volume, and/or inputs, select and present content, etc.). However, when the device intended to "Play content X" is absent from the voice input 122, the devices may benefit from additional information to determine which device is to play content X.

Still referring to FIG. 1, the user 102 may perform a gesture, such as pointing at the device intended to "Play content X." Using wireless transmissions between the ring device 104 (and/or the watch device 106, and/or the smartphone device 108) and the nearby devices such as the display device 110, the stereo speakers 112, the cable box 114, the game console 116, and the streaming media device 118, the ring device 104 (and/or the watch device 106, and/or the smartphone device 108) may determine that the gesture indicates which of the display device 110, the stereo speakers 112, the cable box 114, the game console 116, or the streaming media device 118 is to "Play content X." For example, the ring device 104 (and/or the watch device 106, and/or the smartphone device 108) may exchange wireless communications 150 with the stereo speakers 112, may exchange wireless communications 152 with the display device 110, may exchange wireless communications 154 with the streaming media device 118, may exchange wireless communications 156 with the cable box 114, and may exchange wireless communications 158 with the game console 116. The wireless communications 150, the wireless communications 152, the wireless communications 154, the wireless communications 156, and the wireless communications 158 may include BLE frames (e.g., beacons) or other frames that indicate respective directions between the ring device 104 (and/or the watch device 106, and/or the smartphone device 108) and the other devices (e.g., based on respective indications of angles of departure and/or arrival). The ring device 104 (and/or the watch device 106, and/or the smartphone device 108) may use the wireless communications to determine respective distances between the ring device 104 (and/or the watch device 106, and/or the smartphone device 108) and the other devices (e.g., using time-of-flight/time-of-arrival calculations as indicated by the times at which the wireless communications are transmitted and/or received).

In one or more embodiments, the ring device 104 (and/or the watch device 106, and/or the smartphone device 108) may determine that the gesture (e.g., pointing) may correspond to one of the nearby devices. For example, the device that is nearest to the ring device 104 (and/or the watch device 106, and/or the smartphone device 108) after the gesture (e.g., when the user 102 is pointing) may be the selected device. Alternatively, the device whose distance changed the most from before the gesture may be the selected device. A nearby device whose direction (e.g., angle of arrival or departure) with respect to the ring device 104 (and/or the watch device 106, and/or the smartphone device 108) before the gesture does not change or changes the least (or most, depending on the gesture) after the gesture may indicate a selection of the nearby device. Nearby devices whose distance from the ring device 104 (and/or the watch device 106, and/or the smartphone device 108) after the gesture is greater than the distance from the ring device 104 (and/or the watch device 106, and/or the smartphone device 108) before the gesture may not be the selected device to perform the action (e.g., "Play content X"). In this manner, a gesture using the ring device 104 (and/or the watch device 106, and/or the smartphone device 108) may allow for a determination of the device to perform the action that corresponds to the voice input 122 ("Play content X"). As shown in FIG. 1, the gesture may indicate that the user 102 is pointing to the display device 110, so the content X is displayed using the display device 110 rather than using other devices.

In one or more embodiments, a gesture may be detected using motion data of the ring device 104 (and/or the watch device 106, and/or the smartphone device 108). For example, the ring device 104 (and/or the watch device 106, and/or the smartphone device 108) may detect accelerometer, magnetometer, and/or other data indicating motion with the ring device 104 (and/or the watch device 106, and/or the smartphone device 108). The motion may be translated into one or more gestures. Because the user 102 may wear the ring device 104 on a finger, motion data, such as accelerometer data captured using an accelerometer and/or motion sensor of the ring device 104, that is unique to movements of the user's hand and/or finger may be captured and used to detect certain hand and/or finger movements. Such motion sensor data may provide insights into user motions that may otherwise be unavailable. For example, the watch device 106 worn by the user 102 may be used to determine motions performed by a user's arm, whereas ring-shaped electronic devices, such as the ring device 104, may be used to determine motions performed by a user's hand and/or finger. Accordingly, specific response actions may be associated with specific hand motions (as used herein, hand motions may refer to hand and/or finger motions).

In one or more embodiments, the ring device 104 (and/or the watch device 106, and/or the smartphone device 108) may include one or more motion sensors (e.g., as discussed in FIG. 6) that may be used to determine acceleration and related motion data. The determined motion data may be used to determine an action or hand motion being performed by the user 102 wearing the ring device 104 (and/or the watch device 106, and/or holding the smartphone device 108). The ring device 104 (and/or the watch device 106, and/or the smartphone device 108) may optionally include one or more microphones (e.g., as discussed in FIG. 6) that may be used to detect voice input and/or generate a signal representing audio input.

In one or more embodiments, motion data may include accelerometer data representing changes in acceleration of the ring device 104 (and/or the watch device 106, and/or the smartphone device 108). Motion data may include data output by gyroscopes, accelerometers, and/or other components (e.g., as described with respect to FIG. 6), which may be used in conjunction with, or individually, to detect hand motions performed by the user 102. For example, detected or determined motion data may be compared to stored motion profiles that are associated with certain hand motions or gestures. For example, first motion data may correspond to a motion profile that is associated with a motion of pointing, second motion data may correspond to a motion profile that is associated with a hand motion of waving, and so forth. Computer-executable instructions stored on a memory of a device, such as the ring device 104 (and/or the watch device 106, and/or the smartphone device 108, and/or a cloud-based device as described in FIG. 3), may be executed to determine a first action associated with motion data. For example, one or more modules at the ring device 104 (and/or the watch device 106, and/or the smartphone device 108, and/or a cloud-based device as described in FIG. 3) may determine a first action associated with the motion data. In some embodiments, the ring device 104 (and/or the watch device 106, and/or the smartphone device 108, and/or a cloud-based device as described in FIG. 3) may process motion data and determine the occurrence of a certain motion or event, and may subsequently determine an action associated with the motion data. The action may be a selection of a device to perform one or more actions associated with the voice input 122. In this manner, the ring device 104 (and/or the watch device 106, and/or the smartphone device 108, and/or a cloud-based device as described in FIG. 3) may need a combination of the action indicated by the voice input 122 (e.g. "Play content X") and the device selection as indicated by the gesture to determine that the action (e.g., the presentation of content X) is to be performed by the selected device.

Not all available devices for control may have BLE capabilities, however. In one or more embodiments, such devices (e.g., the display device 110, the stereo speakers 112, the cable box 114, the game console 116, and/or the streaming media device 118) may play sounds at frequencies that the user 102 may not be able to hear, but that other devices, such as the ring device 104 (and/or the watch device 106, and/or the smartphone device 108), may be able to identify (e.g., using a microphone). The ring device 104 (and/or the watch device 106, and/or the smartphone device 108) (e.g., a gesturing device) may determine the volume of such sounds before and after a gesture. The sound presented by a device selected by the gesture may increase (e.g., compared to before the gesture) because, for example, the gesturing device may be closer to the selected device after the gesture (e.g., because the user 102 pointed to the selected device).

In one or more embodiments, when devices available for control may lack BLE capabilities, the user 102 may indicate a selection of such devices by using one or more gestures. During or after the voice input 122 indicative of a request to cause a device to perform an action, the gesturing device may be used to gesture until the selected device has been confirmed by the user 102. For example, the gesturing device may be used to swipe up, down, left, right, etc., which each gesture corresponding to a selection of an available device until the user 102 stops performing such gestures, resulting in the last selected device based on the gestures as the device to perform the one or more actions.

In one or more embodiments, when the ring device 104 (and/or the watch device 106, and/or the smartphone device 108) has determined which device (e.g., itself or another device) is to perform an action indicated by the voice input 122, the device may instruct the selected device to perform the action. When the device is the device intended to perform the action, the device may initiate one or more applications to cause the device to perform the action. When another device is the device intended to perform the action, the device may send one or more commands to the other device indicating to the other device the action to be performed. As shown in FIG. 1, the pointing gesture indicates that content X is to be presented using the display device 110, so the ring device 104 (and/or the watch device 106, and/or the smartphone device 108) may send one or more commands to the display device 110 indicating that the display device 110 is to present content X.

In one or more embodiments, the user 102 may not provide the voice input 122. Instead, a gesture (e.g., the finger pointing as shown in FIG. 1) may be associated with a particular device (e.g., the gesture may map to or otherwise correspond with a particular device), or one of the devices may determine that the most recent command provided by the user 102 (e.g., a prior voice command or other type of command) controlled a particular device, and may associated the gesture with the most recently controlled device.

In one or more embodiments, the ring device 104, the watch device 106, the smartphone device 108, the display device 110, the stereo speakers 112, the cable box 114, the game console 116, and/or the streaming media device 118 may include a personal computer (PC), a smart home device, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Figure 2A:
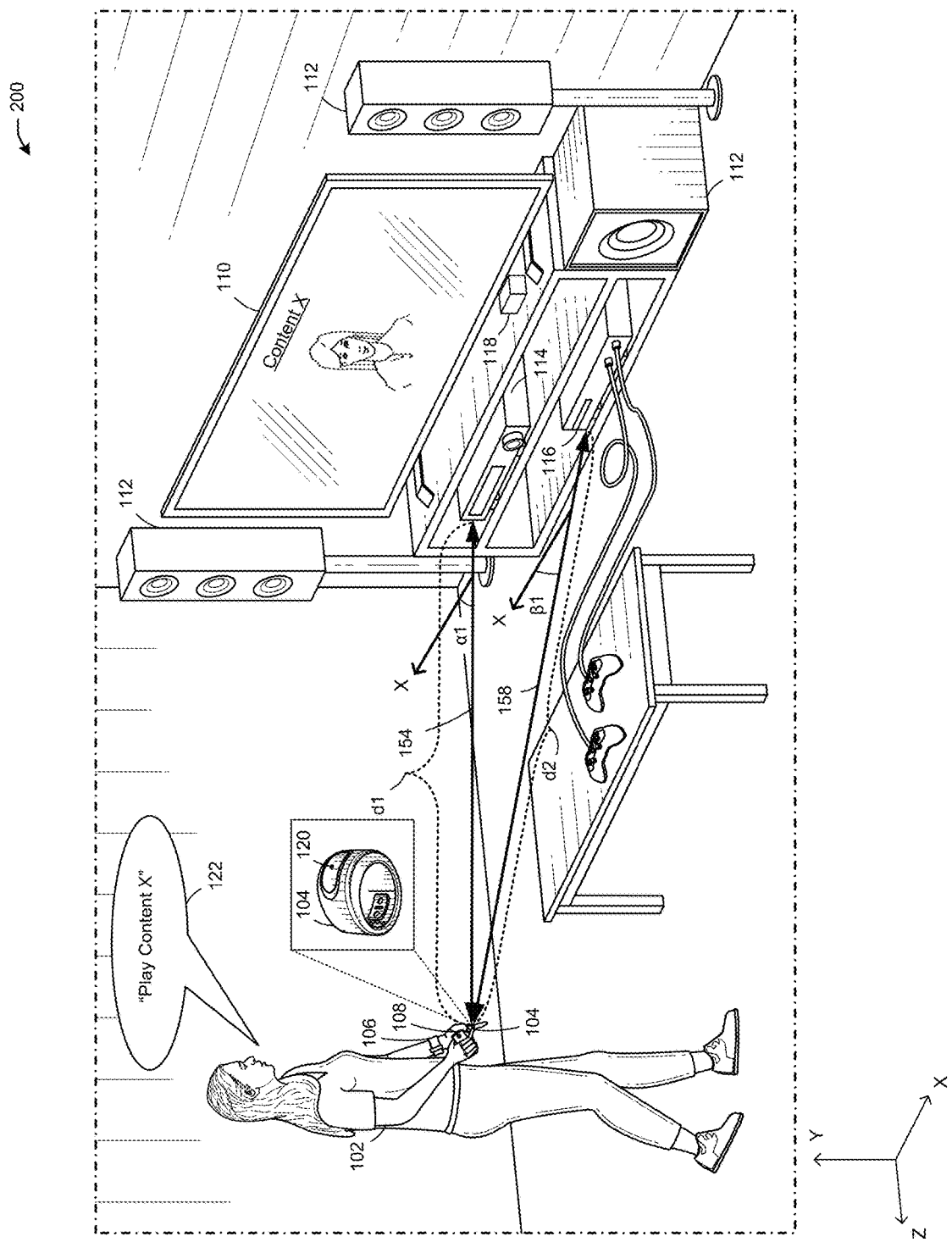
FIG. 2A illustrates an example system for gesture-based selection of devices, in accordance with one or more example embodiments of the present disclosure.

FIG. 2A illustrates an example system 200 for gesture-based selection of devices, in accordance with one or more example embodiments of the present disclosure.

Referring to FIG. 2A, the system 200 includes the ring device 104, the watch device 106, the smartphone device 108, the display device 110, the stereo speakers 112, the cable box 114, the game console 116, and the streaming media device 118 of FIG. 1. The user 102 issues the voice input 122 of "Play content X." FIG. 2A shows, as an example, a choice between playing content X on the display device 110 using the cable box 114 or using the game console 116. The ring device 104 (and/or the watch device 106, and/or the smartphone device 108) exchanges the wireless communications 154 with the cable box 114 and the wireless communications 158 with the game console 116.

Still referring to FIG. 2A, the able box may send the wireless communications 154 (e.g., one or more BLE beacons) to the ring device 104 (and/or the watch device 106, and/or the smartphone device 108). The wireless communications 154 may be sent at an angle of departure $\alpha 1$ with respect to an axis (e.g., the X-axis shown), and/or received at the angle $\alpha 1$ by the ring device 104 (and/or the watch device 106, and/or the smartphone device 108) with respect to the axis. Similarly, the wireless communications 158 may be sent at an angle of departure $\beta 1$ with respect to an axis (e.g., the X-axis shown), and/or received at the angle $\beta 1$ by the ring device 104 (and/or the watch device 106, and/or the smartphone device 108) with respect to the axis. The wireless communications 154 and the wireless communications 158 may include respective beacons sent from each of the cable box 114 and the game console 116 before the user performs a gesture with the ring device 104 (and/or the watch device 106, and/or the smartphone device 108), such as pointing to either the cable box 114 or the game console 116 to indicate that the voice input 122 is intended to cause the cable box 114 or the game console 116 to perform an action (e.g., to present content X). The ring device 104 (and/or the watch device 106, and/or the smartphone device 108) may determine, based on the wireless communications 154, a distance d1 between the ring device 104 (and/or the watch device 106, and/or the smartphone device 108) and the cable box 114. The distance d1 may be determined based on the time of flight of one or more of the wireless communications 154. For example, the wireless communications 154 may indicate a transmission time from the cable box 114, allowing the ring device 104 (and/or the watch device 106, and/or the smartphone device 108) to determine the distance d1 (e.g., given the speed of light at which the wireless communications 154 occurred, and based on the determined time of flight given the transmission time and receipt time of the wireless communications 154). Similarly, the ring device 104 (and/or the watch device 106, and/or the smartphone device 108) may use time-of-flight calculations for the wireless communications 158 to determine the distance d2 between the ring device 104 (and/or the watch device 106, and/or the smartphone device 108) and the game console 116. The wireless communications 154 and/or the wireless communications 158 may include one or more polling frames or probe requests sent by the ring device 104 (and/or the watch device 106, and/or the smartphone device 108). In this manner, the cable box 114 and the game console 116 may send BLE beacons responsive to the polling frames or probe requests (e.g., before a gesture is performed).

Figure 2B:
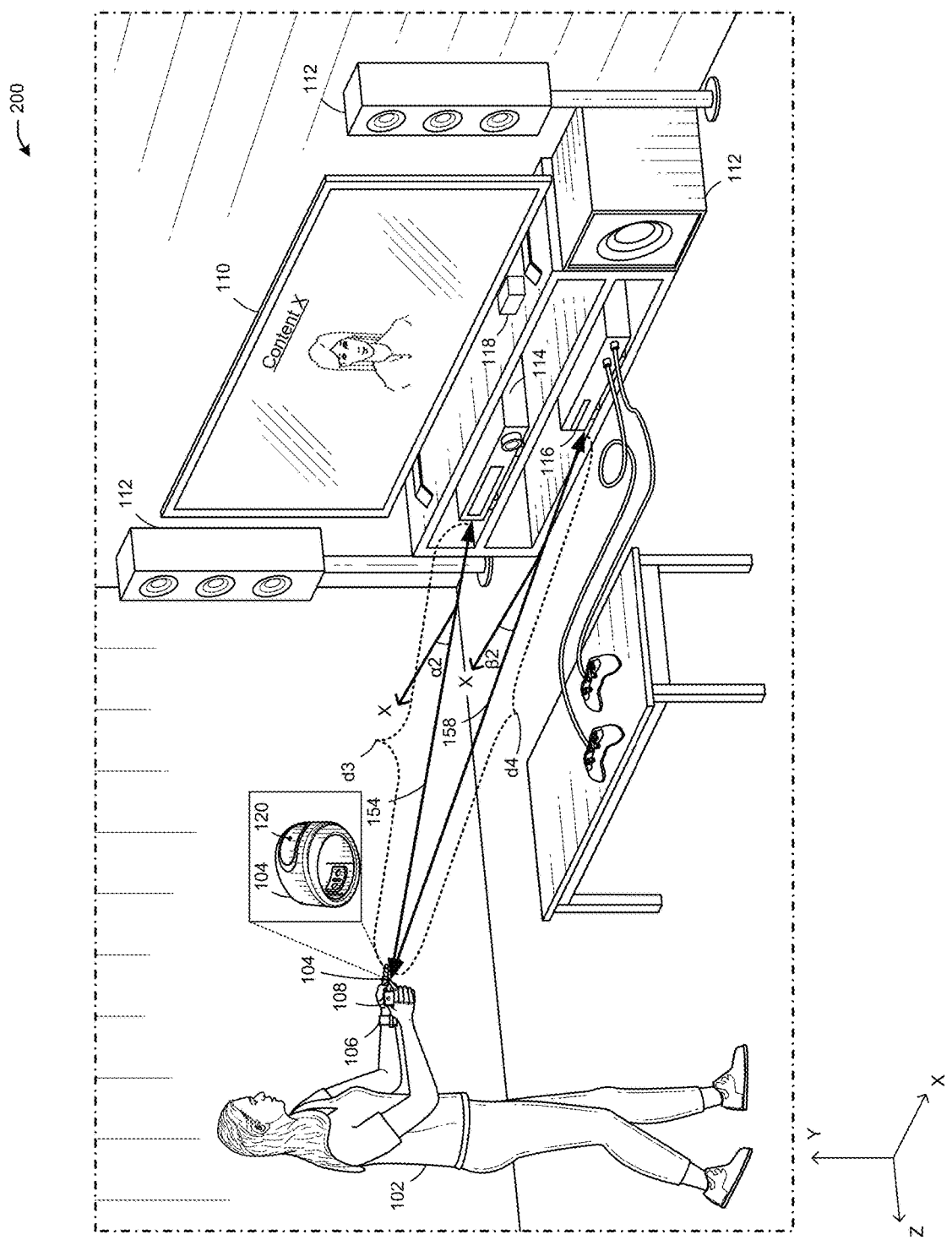
FIG. 2B illustrates an example system for gesture-based selection of devices, in accordance with one or more example embodiments of the present disclosure.

FIG. 2B illustrates an example system 250 for gesture-based selection of devices, in accordance with one or more example embodiments of the present disclosure.

Referring to FIG. 2B, the system 250 shows the user 102 of FIG. 2A after performing (or during performance of) a pointing gesture. To determine whether the user 102 is pointing to the cable box 114 or to the game console 116, indicating which of the cable box 114 or to the game console 116 is to perform an action (e.g., presenting content X) associated with the voice input 122 of FIG. 2A, ring device 104 (and/or the watch device 106, and/or the smartphone device 108) may determine respective distances and directions (e.g., angles of departure and/or arrival) between the ring device 104 (and/or the watch device 106, and/or the smartphone device 108) and the cable box 114 and in between the ring device 104 (and/or the watch device 106, and/or the smartphone device 108) and the game console 116.

Still referring to FIG. 2B, the ring device 104 (and/or the watch device 106, and/or the smartphone device 108) may determine, using time-of-flight calculations for the wireless communications 154 and the wireless communications 158 as described above with respect to FIG. 2A, that the cable box 114 is at a distance d3 from the ring device 104 (and/or the watch device 106, and/or the smartphone device 108) after or during a gesture, that the game console 116 is at a distance d4 from the ring device 104 (and/or the watch device 106, and/or the smartphone device 108) after or during a gesture, that the wireless communications 154 during or after the gesture were transmitted by the cable box 114 at a departure angle $\alpha 2$ with respect to an axis (e.g., the X-axis), that the wireless communications 158 were transmitted by the game console 116 at a departure angle $\beta 2$ with respect to the axis, and/or that the wireless communications 154 and/or the wireless communications 158 were received by the ring device 104 (and/or the watch device 106, and/or the smartphone device 108) at the angle $\alpha 2$ and at the angle $\beta 2$, respectively with respect to the axis. Because the ring device 104 (and/or the watch device 106, and/or the smartphone device 108) may have directionally trained antennae, the ring device 104 (and/or the watch device 106, and/or the smartphone device 108) may determine the direction corresponding to the angles $\alpha 2$ and $\beta 2$. The largest change between $\alpha 2$ and $\alpha 1$, and between $\beta 2$ and $\beta 1$ may be indicative of the selection of a device (e.g., because the gesture was in a direction toward the selected device, resulting in a significant change in directionality between the ring device 104 and the selected device from before the gesture to during/after the gesture). Alternatively, when angles change little or not at all, such may be indicative of the selection of a device (e.g., because the user pointed to a device that resulted in little to no change in direction from the ring device 104 to the selected device).

In one or more embodiments, the device that is nearest to the ring device 104 (and/or the watch device 106, and/or the smartphone device 108) after or during the gesture (e.g., when the user 102 is pointing) may be the selected device. In this manner, the smaller of the distance d3 and the distance d4 may indicate that the closer device to the ring device 104 (and/or the watch device 106, and/or the smartphone device 108) after or during the gesture is the device selected to present content X. Alternatively, the ring device 104 (and/or the watch device 106, and/or the smartphone device 108) may determine a difference between the distance d3 and the distance d1 for the cable box 114, and a difference between the distance d4 and the distance d2 for the game console 116. When one of the differences indicates that the distance d3 or the distance d4 represents a distance decrease (e.g., with respect to the distance d1 and the distance d2, respectively) and/or that the distance d4 or the distance d3 represents a distance increase (e.g., with respect to the distance d2 and the distance d1, respectively), the distance increase may indicate that the device whose distance from the ring device 104 (and/or the watch device 106, and/or the smartphone device 108) after or during the gesture increased from before the gesture is not the selected device. The distance decrease may indicate that the device whose distance from the ring device 104 (and/or the watch device 106, and/or the smartphone device 108) after or during the gesture decreased from before the gesture is the selected device. A device whose direction (e.g., angle of arrival or departure) with respect to the ring device 104 (and/or the watch device 106, and/or the smartphone device 108) before the gesture does not change or changes the least after the gesture may indicate a selection of the nearby device. Nearby devices whose distance from the ring device 104 (and/or the watch device 106, and/or the smartphone device 108) after the gesture is greater than the distance from the ring device 104 (and/or the watch device 106, and/or the smartphone device 108) before the gesture may not be the selected device to perform the action (e.g., "Play content X"). In this manner, a gesture using the ring device 104 (and/or the watch device 106, and/or the smartphone device 108) may allow for a determination of the device to perform the action that corresponds to the voice input 122 ("Play content X"). As shown in FIG. 2B, the gesture may indicate that the user 102 is pointing to the cable box 114, so the content X is displayed using the cable box 114.

In one or more embodiments, the user 102 may not provide the voice input 122. Instead, a gesture (e.g., the finger pointing as shown in FIG. 2B) may be associated with a particular device (e.g., the gesture may map to or otherwise correspond with a particular device), or one of the devices may determine that the most recent command provided by the user 102 (e.g., a prior voice command or other type of command) controlled a particular device, and may associated the gesture with the most recently controlled device.

Figure 3:
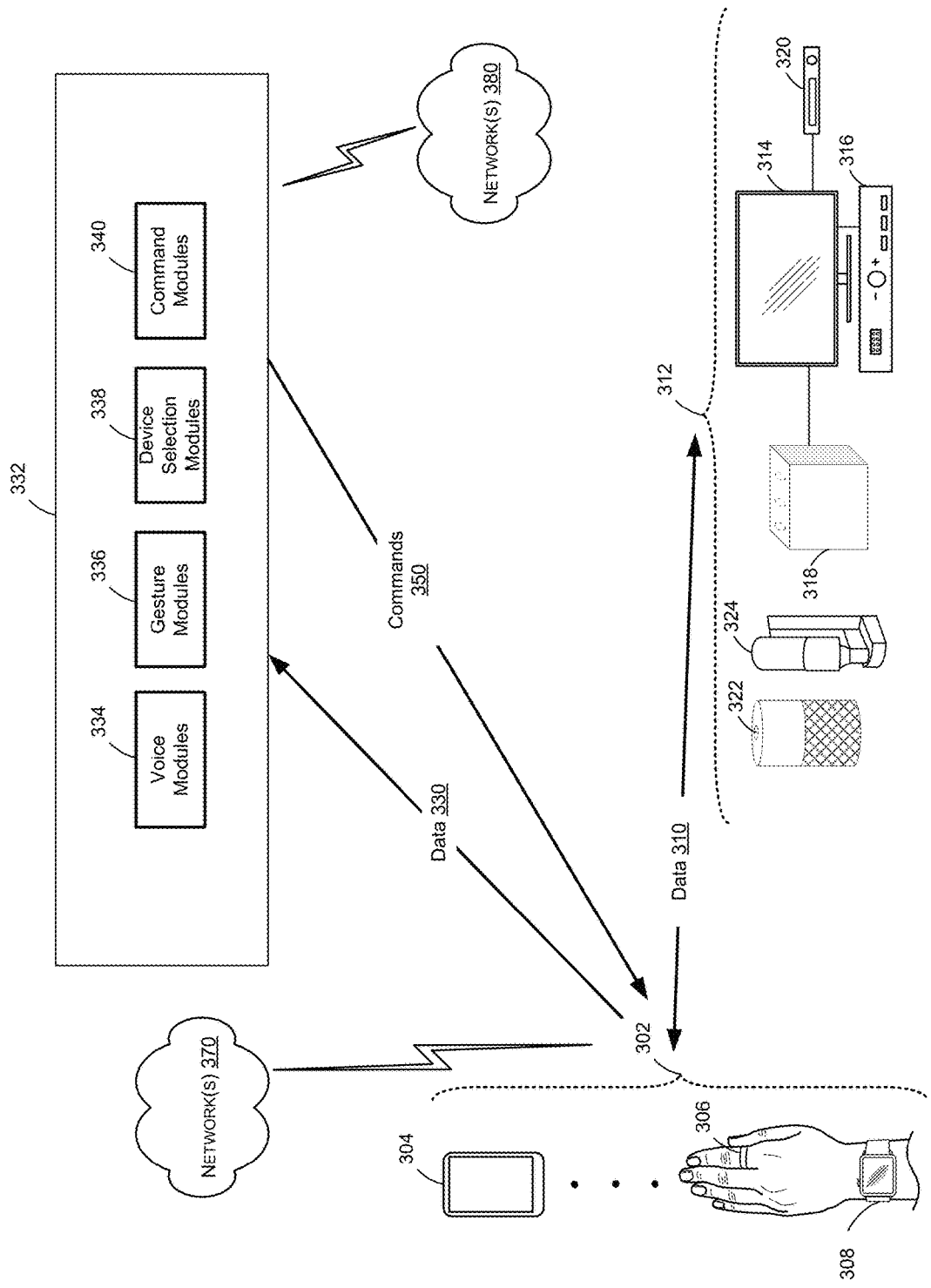
FIG. 3 illustrates an example system for gesture-based selection of devices, in accordance with one or more example embodiments of the present disclosure.

FIG. 3 illustrates an example system 300 for gesture-based selection of devices, in accordance with one or more example embodiments of the present disclosure.

Referring to FIG. 3, the system 300 may include one or more devices 302, such as device 304, device 306, and device 308 (e.g., similar to the ring device of FIG. 1, the watch device 106 of FIG. 1, and the smartphone device 108 of FIG. 1, respectively), in communication with one another and in communication with one or more devices 312, such as device 314 (e.g., similar to the display device 110 of FIG. 1), device 316 (e.g., similar to the cable box 114 of FIG. 1), device 318 (e.g., similar to the streaming media device 118 of FIG. 1), device 320, device 322 (e.g., similar to the game console 116 of FIG. 1), device 322 (e.g., a smart home device with audio and/or video output), and device 324 (e.g., a projector device). The one or more devices 302 and the one or more devices 312 may exchange data 310, such as BLE data (e.g., the wireless communications 150-158 of FIG. 1) or other wireless data used to determine device locations/distances, sound data, gesture data, and the like. The one or more devices 302 may send data 330 (e.g., voice data such as data representing the voice input 122 of FIG. 1), motion data, and other device data (e.g., device inputs, etc.) to a remote network 332 (e.g., a cloud-based network). The remote network 332 (and/or the one or more devices 302) may include one or more voice modules 334, one or more gesture modules 336, device selection modules 338, and one or more command modules 340.

In one or more embodiments, the one or more voice modules 334 may translate voice data included in the data 330 into one or more commands (e.g., associated with causing the one or more devices 302 and/or the one or more devices 312 to perform an action based on the voice data). The one or more gesture modules 336 may determine that device motion data included in the data 330 may correspond to one or more gestures (e.g., pointing, swiping, etc.) indicative of a command and/or that a device (e.g., the one or more devices 302 and/or the one or more devices 312) is to perform an action identified based on the voice data. The one or more device selection modules 338 may determine, based on voice and/or motion data included in the data 330, a device that has been selected to perform the action identified based on the voice data. The one or more command modules 340 may generate one or more commands 350 sent by the remote network 332 to the one or more devices 302 (and/or to the one or more devices 312) indicating the action to be performed based on the voice data, and the device to perform the action.

In one or more embodiments, the data 310 exchanged between the one or more devices 302 and the one or more devices 312 may indicate the distance and direction between devices (e.g., the distance d1 and the distance d2 of FIG. 2A, the angle α1 and the angle β1 of FIG. 2A, the distance d3 and the distance d4 of FIG. 2B, the angle α2 and the angle β2 of FIG. 2B). For example, the data 310 may include BLE transmissions, such as BLE beacons defined by the IEEE Bluetooth 5.1 technical standard, may indicate an angle of departure (e.g., transmission) and/or angle of arrival (e.g., receipt). A device sending a BLE frame may indicate the angle of departure (e.g., the angle at which the device transmitted the BLE frame). A device receiving a BLE frame may measure the angle at which the device received the BLE frame.

In one or more embodiments, when the one or more devices 302 receives a voice input (e.g., the voice input 122 of FIG. 1), the device may translate the voice input into the one or more commands 350, or may send the voice input (e.g., via the data 330) to another device (e.g., the remote network 332) for translation into the one or more commands 350. When the voice input corresponds to (e.g., is intended to) one or more actions to be performed by another device, the device user (e.g., the user 102 of FIG. 1) may indicate in the voice input the device to perform the one or more actions. However, when the voice input does not specify the device to perform the one or more actions, the directionality of BLE frames may be used to determine the device to perform the one or more actions. For example, when the one or more devices 302 is used to perform a gesture, such as pointing at another device as shown in FIG. 2B, motion data (e.g., based on device accelerometer data or other motion data) of the one or more devices 302 may correspond to the gesture, and based on the distances and/or angles between the gesturing device and other devices available to perform the one or more actions (e.g., the one or more devices 312), the gesturing device or another device may determine that the gesture indicates that the one or more actions are to be performed by a device to which the gesturing device is pointing. To determine a device to which a person points or otherwise gestures, the gesturing device or another device may determine the distances and/or angles between the gesturing device and one or more available devices before and after the gesture. When the gesture is indicative of a user pointing to another device to be selected for performance of the one or more actions, the distance between the gesturing device and other available devices before the gesture may increase after the gesture, and the distance between the gesturing device and the selected device before the gesture may decrease after the gesture (e.g., because the gesture results in the person's hand moving toward the device at which the person is pointing). Similarly, the arrival or departure angle of the selected device before the gesture may not change after the gesture (or may change less than the arrival or departure angle of the other available devices from before the gesture to after the gesture). In this manner, the direction associated with the arrival or departure angle may not change, or may change less, for the selected device.

Not all available devices for control may have BLE capabilities, however. In one or more embodiments, the one or more devices 312 may play sounds at frequencies that device users may not be able to hear, but that the one or more devices 302 may be able to identify (e.g., using a microphone). The gesturing device (e.g., one of the one or more devices 302) may determine the volume of such sounds before and after a gesture. The sound presented by a device selected by the gesture may increase (e.g., compared to before the gesture) because, for example, the gesturing device may be closer to the selected device after the gesture (e.g., because the device user pointed to the selected device).

In one or more embodiments, when devices available for control may lack BLE capabilities, a device user may indicate a selection of such devices by using one or more gestures. During or after a voice command indicative of a request to cause a device to perform an action, the gesturing device (e.g., the one or more devices 302) may be used to gesture until the selected device (e.g., the one or more devices 302 or the one or more devices 312) has been confirmed by the device user. For example, the gesturing device may be used to swipe up, down, left, right, etc., which each gesture corresponding to a selection of an available device until the user stops performing such gestures, resulting in the last selected device based on the gestures as the device to perform the one or more actions.

In one or more embodiments, when the one or more devices 302 has determined which device (e.g., itself or another device) is to perform an action indicated by a voice input, the one or more devices 302 may instruct the selected device to perform the action (e.g., using the data 310 or other communications). When the one or more devices 302 includes the device intended to perform the action, the one or more devices 302 may initiate one or more applications to cause the device to perform the action. When the one or more devices 312 includes s the device intended to perform the action, the one or more devices 302 may send one or more commands (e.g., via the data 310) to the one or more devices 312 indicating to the other device the action to be performed.

Figure 4A:
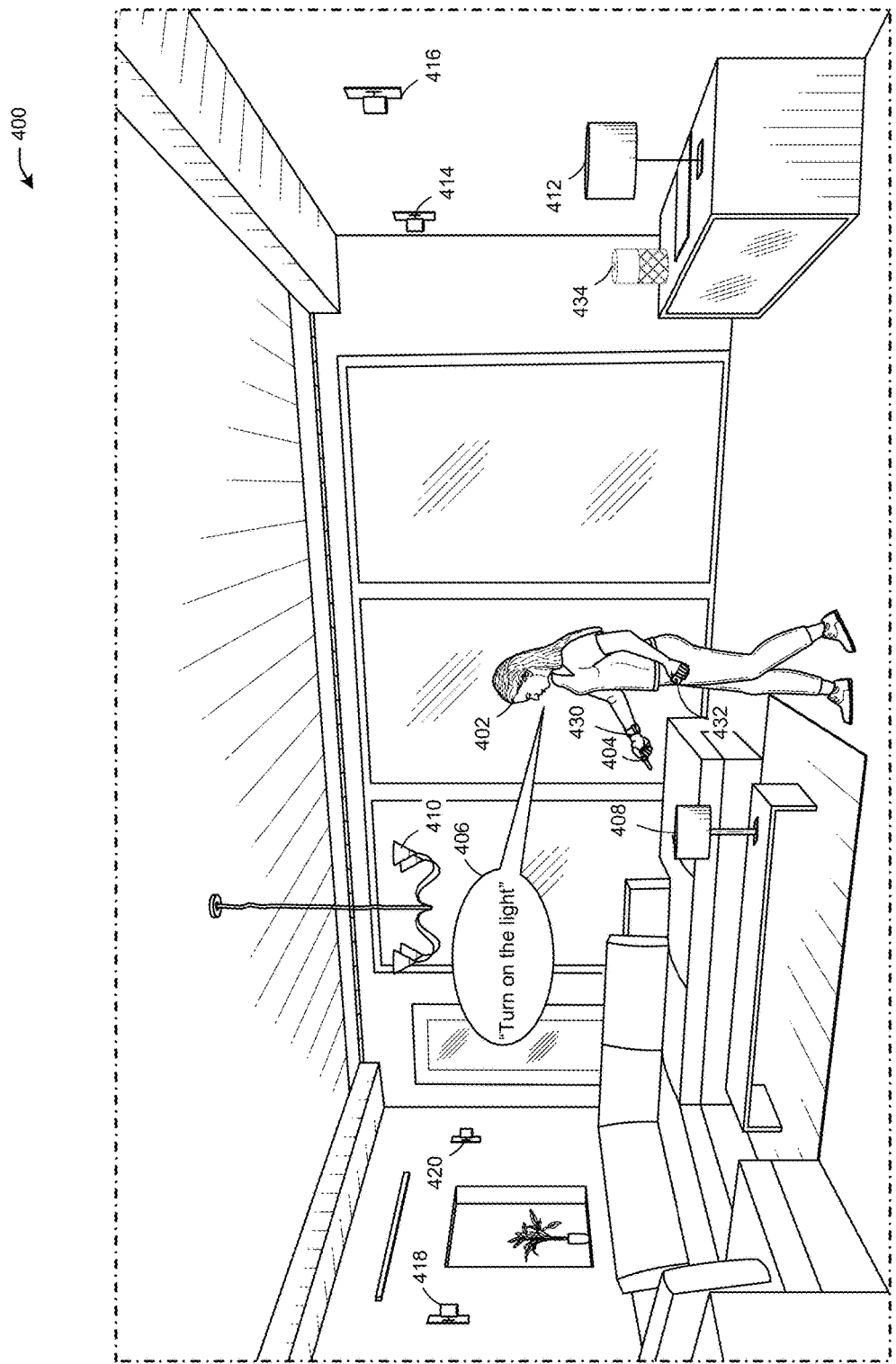
FIG. 4A illustrates an example system for gesture-based selection of devices, in accordance with one or more example embodiments of the present disclosure.
Figure 4B:
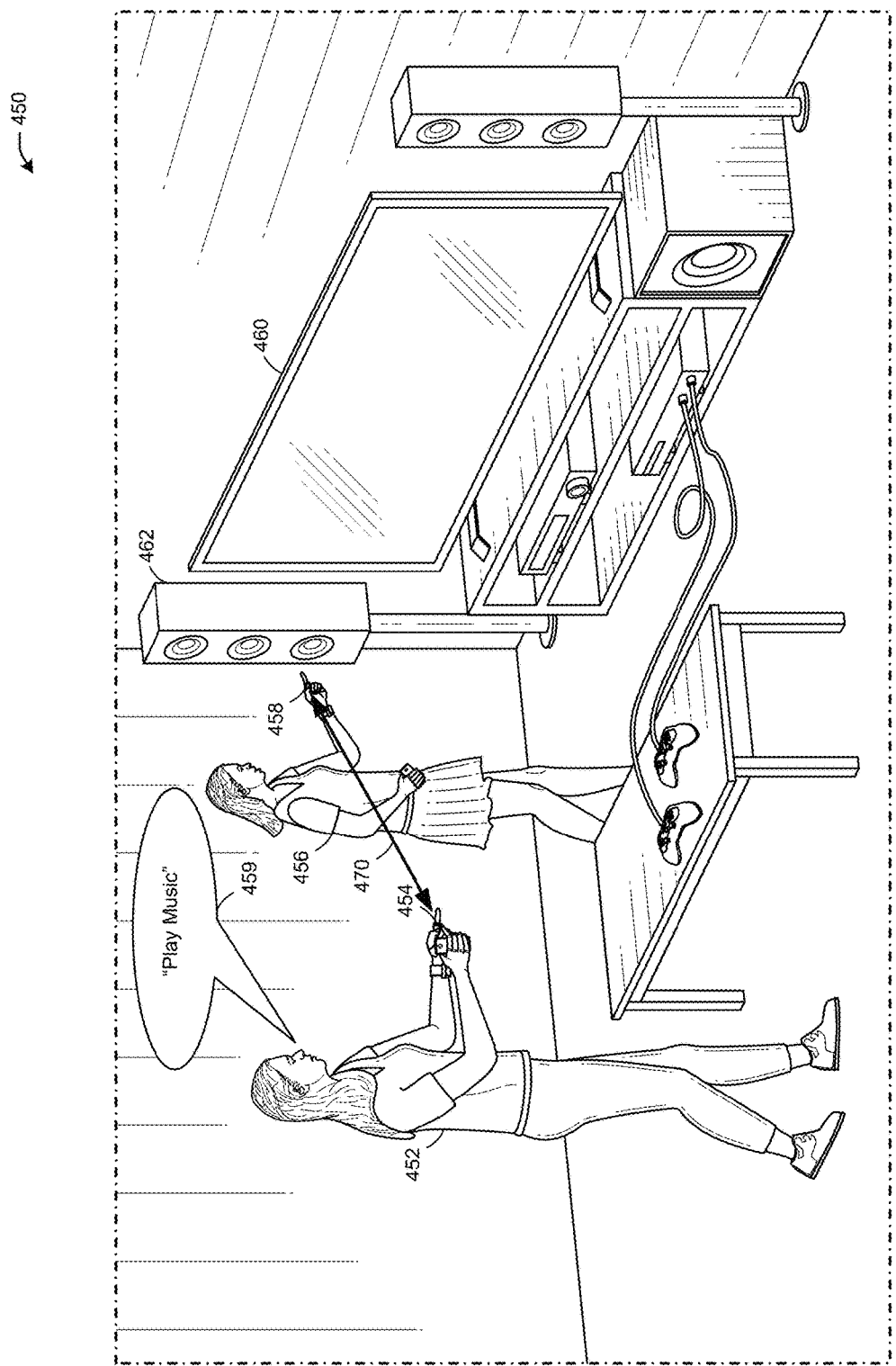
FIG. 4B illustrates an example system for gesture-based selection of devices, in accordance with one or more example embodiments of the present disclosure.

In one or more embodiments, multiple devices among the one or more devices 302 may coordinate with one another (e.g., using wireless communications such as Wi-Fi, Bluetooth, Zigbee, LTE, ultrasound, and the like) to determine which commands and gestures are to be translated and/or take priority (e.g., as explained further with respect to FIG. 4B). For example, two users may make gestures indicating selections of devices to perform an action. To avoid conflicting decisions, the devices of the one or more devices 302 may indicate to one another the gestures that they have received based on detected motion data. The devices of the one or more devices 302 may negotiate which device has priority to translate its gesture into a selection of a device to perform an action, and the device with the higher priority may translate the gesture or send its motion data (e.g., the data 330) to another device (e.g., the remote network 332) for gesture translation to select a device to perform the action.

The one or more devices 302 may be configured to communicate via a communications network 370, and the remote network 332 may be configured to communicate via a wireless communications network 380, wirelessly or wired. The communications network 370 and/or the communications network 380 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 370 and/or the communications network 380 may have any suitable communication range associated therewith and may include, for example, global networks (e.g., the Internet), metropolitan area networks (MANs), wide area networks (WANs), local area networks (LANs), or personal area networks (PANs). In addition, communications network 370 and/or the communications network 380 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

FIG. 4A illustrates an example system 400 for gesture-based selection of devices, in accordance with one or more example embodiments of the present disclosure.

Referring to FIG. 4A, the system 400 may include a user 402 (e.g., a device user) wearing or otherwise operating a device 404 (e.g., the one or more devices 302 of FIG. 3). The user 402 may utter a voice input 406, such as "Turn on the light." However, as shown in FIG. 4A, the user 402 may be in a room with multiple lights that may be turned on by the voice input 406. For example, light device 408 (e.g. a lamp), light device 410 (e.g., a chandelier or other light fixture), light device 412 (e.g., a lamp), light device 414 (e.g., a wall-mounted or other light device), light device 416 (e.g., a wall-mounted or other light device), light device 418 (e.g., a wall-mounted or other light device), and light device 420 (e.g., a wall-mounted or other light device) may be controlled by voice inputs, gestures, and/or other commands. Because the voice input 406 does not identify the specific light device(s) to turn on, gesture data using the device 404 may be used to identify the light device to perform an action (e.g., to turn on) based on the voice input 406. Alternatively, the user 402 may not provide the voice input 406, and instead may rely on a gesture (e.g., the finger pointing shown in FIG. 4A, clapping, or another gesture). The gesture may be associated with a particular device (e.g., the gesture may map to or otherwise correspond with a particular device), or one of the devices may determine that the most recent command provided by the user 402 (e.g., a prior voice command or other type of command) controlled a particular device, and may associated the gesture with the most recently controlled device. In one or more embodiments, when the gesture (e.g., a finger point) toward the light device 408 indicates a selection of the light device 408, a command may be determined based on available actions that the light device 408 may perform (e.g., turn on or off).

Still referring to FIG. 4A, the user 402 is shown making a pointing gesture to the light device 408. Using one or more of BLE beacons, sounds, and/or additional gestures as described with respect to FIG. 2A and FIG. 2B, the device 404 may identify motion data, determine that the motion data indicates a gesture (e.g., pointing, swiping, etc.), that the gesture indicates that the user 402 has selected the light device 408 to perform an action based on the voice input 406, and that the voice input 406 is associated with causing a device indicated by the gesture to perform the action (e.g., to turn on). In this manner, the device 404 may distinguish between multiple devices that may perform the action stated in or otherwise based on the voice input 406.

In one or more embodiments, the light devices in FIG. 4A may be smart IoT devices capable of communicating with the device 404 using one or more wireless communications techniques. In this manner, the device 404 may instruct the light devices to perform actions by sending commands to the light devices using the one or more wireless communication techniques.

FIG. 4B illustrates an example system 450 for gesture-based selection of devices, in accordance with one or more example embodiments of the present disclosure.

Referring to FIG. 4B, a user 452 may be wearing or otherwise operating a device 454 (e.g., similar to the one or more devices 302 of FIG. 3), and a user 456 may be wearing or otherwise operating a device 458 (e.g., similar to the one or more devices 302 of FIG. 3). Both the user 452 and the user 456 may be making gestures (e.g., with the device 454 and the device 458, respectively) that indicate the selection of a device to perform an action (e.g., corresponding to the voice input 459 uttered by the user 452—"Play music"). To determine which of the device 460 or the device 462 is to play the music based on the voice input 459, the device 454 and/or the device 458 may be used to perform motion indicative of one or more gestures. However, as shown in FIG. 4B, the user 452 may use the device 454 to perform a pointing gesture toward the device 460, whereas the user 456 may use the device 458 to perform a pointing gesture toward the device 462. In this manner, the user 452 and the user 456 may be shown in FIG. 4B as selecting different devices with which to perform an action (e.g., to play music).

Still referring to FIG. 4B, the device 454 and the device 458 may exchange wireless communications 470 (e.g., using Bluetooth, Wi-Fi, LTE, ultrasound, Zigbee, etc.). The wireless communications 470 may include negotiations between the device 454 and the device 458 in which the device 454 and the device 458 agree that when both devices detect motion data indicative of a gesture or other data indicative of a selection of a device to perform the action (e.g., to play music), one of the device 454 or the device 458 is to take priority and use its motion data to determine the selected device to perform the action (e.g., the other device may refrain from performing an action based on a detected gesture or input, or may refrain from sending device data to be translated into a gesture or other input). In this manner, the wireless communications 470 may include the motion data detected by the device 454 and the device 458 so that the device 454 and the device 458 may determine when both the device 454 and the device 458 have detected gestures or other inputs that may conflict. Alternatively, the device 454 and the device 458 may determine which device's gesture to translate based on the user associated with the voice input 459 (e.g., the user 452), which may be based on voice recognition, voice volume (e.g., indicating which of the device 454 and the device 458 is closer to the user who provided the voice input 459), or the like. Such an association of the voice input 459 to the device 454 or to the device 458 may be performed by the device 454 and/or the device 458, by another device (e.g., the remote network 332 of FIG. 3).

Figure 5A:
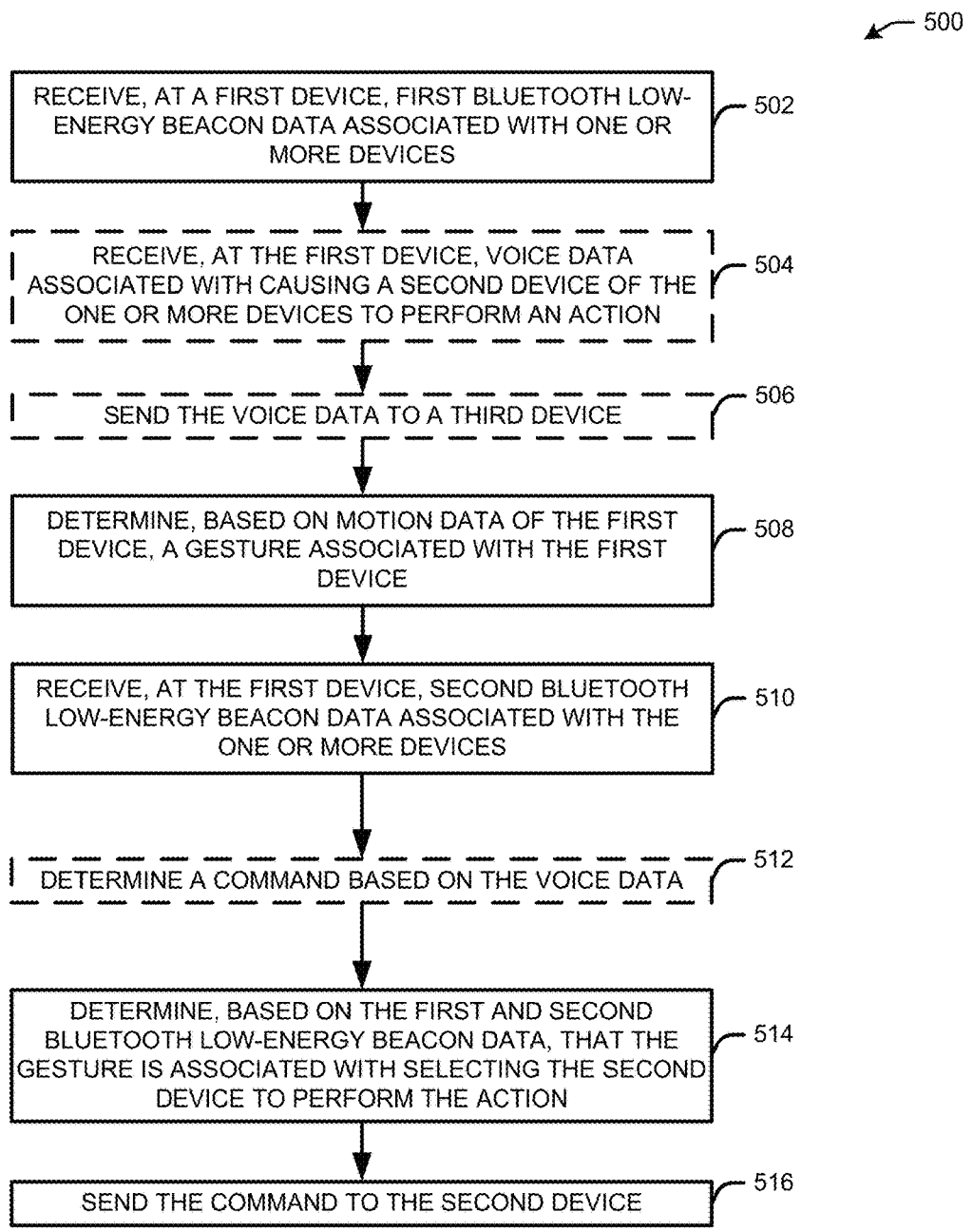
FIG. 5A illustrates a flow diagram for a process for gesture-based selection of devices, in accordance with one or more example embodiments of the present disclosure.

FIG. 5A illustrates an example flow diagram for a process 500 for gesture-based selection of devices, in accordance with one or more example embodiments of the present disclosure.

At block 502, a device (e.g., the one or more devices 302 of FIG. 3, the remote network 332 of FIG. 3) may receive first BLE beacon data (e.g., the wireless communications 154 and the wireless communications 158 of FIG. 2A, the data 310 of FIG. 3, or indications of the wireless communications 154 and/or the wireless communications 158 as provided in the data 330 of FIG. 3) from one or more other devices (e.g., the one or more devices 312 of FIG. 3). The data from the BLE beacons or other wireless communications may be indicative of transmission and/or reception angles that the device may use to determine respective distances and/or directions between the device and the one or more other devices. For example, the BLE beacons may include transmission timing data, allowing the device to determine the time-of-flight between the device and the one or more other devices. The first BLE beacon data may be received before the device is used to perform a gesture and/or before the device detects a voice input (e.g., the voice input 122 of FIG. 1). The first BLE beacon data may be received in response to polling frames and/or probe requests sent by the device to the one or more other devices.

At block 504, the device optionally may receive voice data (e.g., the voice input 122 of FIG. 1) associated with causing a second device (e.g., the game console 116 of FIG. 1) of the one or more devices to perform an action. However, the voice data may not specify (e.g., explicitly mention) the second device, so the device may not be able to determine from the voice data alone that the second device is intended to perform an action based on the voice data, such as to turn on or off, to present content, to alter device settings, to initiate a transaction, to set a reminder, or the like. At block 506, the device optionally may translate the voice data into one or more commands, or may send the voice data to a third device (e.g., the remote network 332 of FIG. 3) for translation. The translation may determine that one or more commands (e.g., the action) are intended by the voice data. Alternatively, a voice command may be received and/or translated into one or more commands by another device, or the device may receive the voice data from another device and may translate the voice data.

At block 508, the device may identify motion data associated with the device (e.g., accelerometer data), and may determine, based on the motion data, a gesture associated with the first device. The determined motion data may be used to determine an action or hand motion being performed by a user of the device. For example, detected or determined motion data may be compared to stored motion profiles that are associated with certain hand motions or gestures. For example, first motion data may correspond to a motion profile that is associated with a motion of pointing, second motion data may correspond to a motion profile that is associated with a hand motion of waving, and so forth. Computer-executable instructions stored on a memory of the device or the third device may be executed to determine a first action associated with motion data. For example, one or more modules (e.g., the one or more gesture modules 336 of FIG. 3) may determine a first action associated with the motion data. In some embodiments, the device or the third device may process motion data and determine the occurrence of a certain motion or event, and may subsequently determine an action associated with the motion data. The action may be a selection of the second device to perform one or more actions.

At block 510, the device may receive second BLE beacon data or other data from wireless transmissions from the one or more other devices. The device may request the second BLE beacons in response to detection of the gesture or detection that a gesture mode has been initiated (e.g., by touching the button 120 of FIG. 1), or the second BLE beacon data may be received without prompting. The BLE beacon data or other wireless communications may be indicative of transmission and/or reception angles that the device may use to determine respective distances and/or directions between the device and the one or more other devices. For example, the BLE beacon data may include transmission timing data, allowing the device to determine the time-of-flight between the device and the one or more other devices. The second BLE beacon data may be received during or after the device is used to perform a gesture and/or after the device detects a voice input (e.g., the voice input 122 of FIG. 1).

At block 512, the device optionally may determine a command based on the voice data. For example, when the device sends the voice data to the third device at block 506 for translation, the third device may translate the voice data into a command, and may send the command (e.g., the one or more commands 350 of FIG. 3) to the device. The device may determine that the command is to perform the action using the device selected by the gesture. In this manner, the device may associate the gesture with the command.

At block 514, the device may determine, based on the first and second BLE beacon data, that the gesture is associated with selecting the second device to perform the action associated with the command. For example, the device that is nearest to the device after or during the gesture may be the selected device to perform the action. Alternatively, the device may determine a difference between the pre-gesture and post-gesture (or during gesture) distances between the device the one or more additional devices. When one of the differences indicates that one of the one or more additional devices is closer after/during the gesture than before the gesture, that device may be the device selected by the gesture to perform the command. The transmission and/or reception angle of the BLE beacons between the device and the second device may not have changed from the first BLE beacons to the second BLE beacons, or may have changed less than the angle changes of other devices of the one or more additional devices, thereby indicating that the gesture is aimed at (e.g., pointed or waived to) the second device.

At block 516, the device may send the command or an indication of the command to the second device to indicate to the second device to perform the command. The command may be sent to the second device from the device, or may be sent to the second device by first sending the command to another device to provide to the second device. Alternatively, another device may send the command to the second device.

Figure 5B:
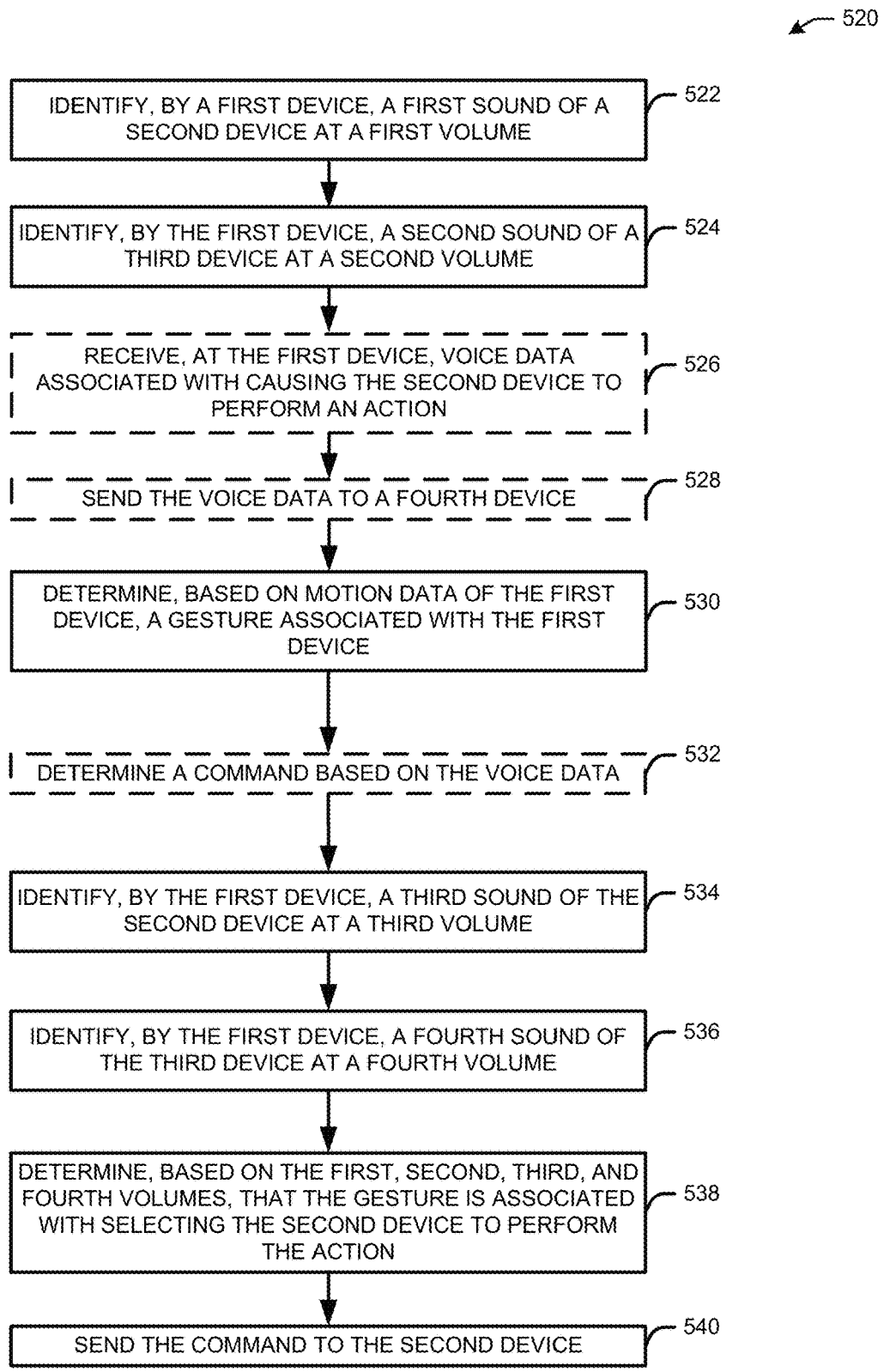
FIG. 5B illustrates a flow diagram for a process for gesture-based selection of devices, in accordance with one or more example embodiments of the present disclosure.

FIG. 5B illustrates an example flow diagram for a process 520 for gesture-based selection of devices, in accordance with one or more example embodiments of the present disclosure.

At block 522, a device (e.g., the one or more devices 302 of FIG. 3, the remote network 332 of FIG. 3) may identify a first sound (e.g., waveform) of a second device (e.g., of the one or more devices 312 of FIG. 3) at a first volume or intensity. At block 524, the device may identify a second sound (e.g., waveform) of a third device at a second volume or intensity. The second and third devices may play sounds or otherwise transmit waveforms at frequencies that device users may not be able to hear, but that the device may be able to identify (e.g., using a microphone), or that the device may receive from another device (e.g., using the data 330 of FIG. 3). The sounds/waveforms may be used in place of BLE beacons or other wireless communications that may be used to indicate distance between devices (e.g., based on time-of-flight calculations) and/or angles/directions between devices. A volume or intensity may be indicative of a distance between the device and another device. For example, a higher volume or intensity detected by indicate a shorter distance. In this manner, similar to the use of BLE beacons, a gesture may indicate a selection of a device when the volume or intensity of a sound received from a device is louder than the volume or intensity of a sound received by another device (e.g., because the gesture may indicate that a user pointed to or otherwise motioned toward the device whose received sound was louder). When only one device provides a sound, the lack of other device options to select may indicate the selection of the one device that provided a sound.

At block 526, the device optionally may receive voice data (e.g., the voice input 122 of FIG. 1) associated with causing a second device (e.g., the game console 116 of FIG. 1) of the one or more devices to perform an action. However, the voice data may not specify (e.g., explicitly mention) the second device, so the device may not be able to determine from the voice data alone that the second device is intended to perform an action based on the voice data, such as to turn on or off, to present content, to alter device settings, to initiate a transaction, to set a reminder, or the like. At block 528, the device may translate the voice data into one or more commands, or may send the voice data to a third device (e.g., the remote network 332 of FIG. 3) for translation. The translation may determine that one or more commands (e.g., the action) are intended by the voice data.

At block 530, the device may identify motion data associated with the device (e.g., accelerometer data), and may determine, based on the motion data, a gesture associated with the first device. The determined motion data may be used to determine an action or hand motion being performed by a user of the device. For example, detected or determined motion data may be compared to stored motion profiles that are associated with certain hand motions or gestures. For example, first motion data may correspond to a motion profile that is associated with a motion of pointing, second motion data may correspond to a motion profile that is associated with a hand motion of waving, and so forth. Computer-executable instructions stored on a memory of the device or the third device may be executed to determine a first action associated with motion data. For example, one or more modules (e.g., the one or more gesture modules 336 of FIG. 3) may determine a first action associated with the motion data. In some embodiments, the device or the third device may process motion data and determine the occurrence of a certain motion or event, and may subsequently determine an action associated with the motion data. The action may be a selection of the second device to perform one or more actions.

At block 532, the device may determine a command based on the voice data. For example, when the device sends the voice data to the third device at block 528 for translation, the third device may translate the voice data into a command, and may send the command (e.g., the one or more commands 350 of FIG. 3) to the device. The device may determine that the command is to perform the action using the device selected by the gesture. In this manner, the device may associated the gesture with the command.

At block 534, the device may identify a third sound (e.g., waveform) of the second device (e.g., of the one or more devices 312 of FIG. 3) at a third volume or intensity. At block 536, the device may identify a fourth sound (e.g., waveform) of the third device at a fourth volume or intensity. The second and third devices may play sounds at frequencies that device users may not be able to hear, but that the device may be able to identify (e.g., using a microphone), or that the device may receive from another device (e.g., using the data 330 of FIG. 3). The sounds may be used in place of BLE beacons or other wireless communications that may be used to indicate distance between devices (e.g., based on time-of-flight calculations) and/or angles/directions between devices. The first and second sounds may be presented before a gesture and/or voice command, and the third and fourth sounds may be presented after or during a gesture and/or after a voice command.

At block 538, the device may determine based on the first, second, third, and fourth volumes, that the gesture is associated with selecting the second device to perform the action associated with the command. The device may determine the volume of such sounds before and after a gesture. The sound presented by the second device selected by the gesture may increase (e.g., compared to before the gesture) because, for example, the device may be closer to the second device after the gesture (e.g., because the device user pointed to the selected device).

At block 540, the device may send the command or an indication of the command to the second device to indicate to the second device to perform the command. The command may be sent to the second device from the device, or may be sent to the second device by first sending the command to another device to provide to the second device. Alternatively, another device may send the command to the second device.

Figure 5C:
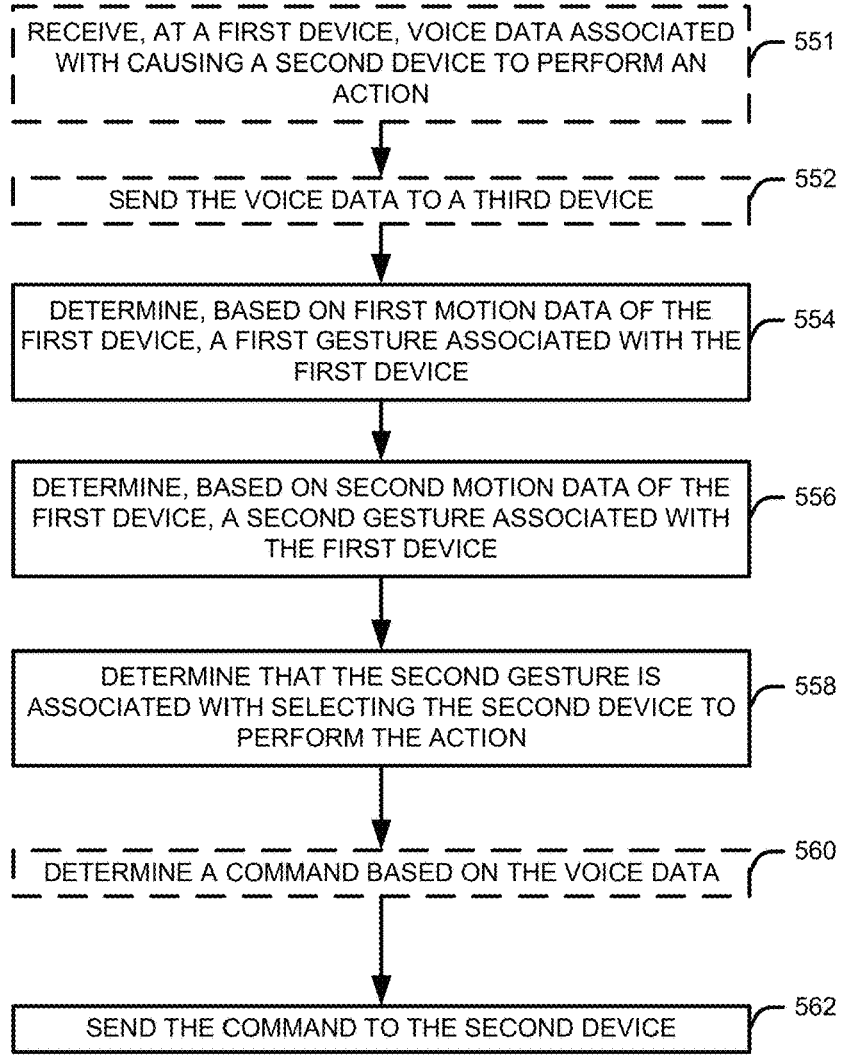
FIG. 5C illustrates a flow diagram for a process for gesture-based selection of devices, in accordance with one or more example embodiments of the present disclosure.

FIG. 5C illustrates an example flow diagram for a process 550 for gesture-based selection of devices, in accordance with one or more example embodiments of the present disclosure.

At block 551, a device (e.g., the one or more devices 302 of FIG. 3, the remote network 332 of FIG. 3) optionally may receive voice data (e.g., the voice input 122 of FIG. 1) associated with causing a second device (e.g., the game console 116 of FIG. 1) of one or more other devices to perform an action. However, the voice data may not specify (e.g., explicitly mention) the second device, so the device may not be able to determine from the voice data alone that the second device is intended to perform an action based on the voice data, such as to turn on or off, to present content, to alter device settings, to initiate a transaction, to set a reminder, or the like. At block 552, the device optionally may translate the voice data into one or more commands, or may send the voice data to a third device (e.g., the remote network 332 of FIG. 3) for translation. The translation may determine that one or more commands (e.g., the action) are intended by the voice data. The voice data may be received from another device and translated by the device, or the device may translate the voice data into one or more commands.

At block 554, the device may identify first motion data associated with the device (e.g., accelerometer data), and may determine, based on the first motion data, a first gesture associated with the first device. At block 556, the device may identify second motion data associated with the device (e.g., accelerometer data), and may determine, based on the second motion data, a second gesture associated with the first device. At block 558, the device may determine that the second gesture is associated with selecting the second device to perform the action. The first gesture may correspond to a device selection mode, and the second gesture may correspond to swipes or other motions indicating a virtual scrolling through available devices to perform the action. For example, each motion may correspond to a hand waive that effectively "swipes" a virtual selector from one device to another (e.g., the available devices for performing the action) until the user stops the gestures (e.g., ends the device selection mode). For example, the gesturing device may be used to swipe up, down, left, right, etc., which each gesture corresponding to a selection of an available device until the user stops performing such gestures, resulting in the last selected device based on the gestures as the device to perform the one or more actions.

At block 560, the device optionally may determine a command based on the voice data. For example, when the device sends the voice data to the third device at block 562 for translation, the third device may translate the voice data into a command, and may send the command (e.g., the one or more commands 350 of FIG. 3) to the device. The device may determine that the command is to perform the action using the device selected by the gesture. In this manner, the device may associate the gesture with the command.

At block 562, the device may send the command or an indication of the command to the second device to indicate to the second device to perform the command. The command may be sent to the second device from the device, or may be sent to the second device by first sending the command to another device to provide to the second device. Alternatively, another device may send the command to the second device.

Referring to FIG. 5A, FIG. 5B, and FIG. 5B, when the voice command is associated with presenting content on the second device, the content may be provided by any device (e.g., the one or more devices 302 of FIG. 3, the one or more devices 312 of FIG. 3, the remote network 332 of FIG. 3), and may be routed from any device to the second device. For example, when the content is provided by the remote network 332 of FIG. 3, the content may be provided to any of the one or more devices 302 and routed to the second device for presentation. The distance and/or direction data used to determine the selected second device may be used by the device for which the gesture is detected, or may be provided to another device for such a determination.

Figure 5D:
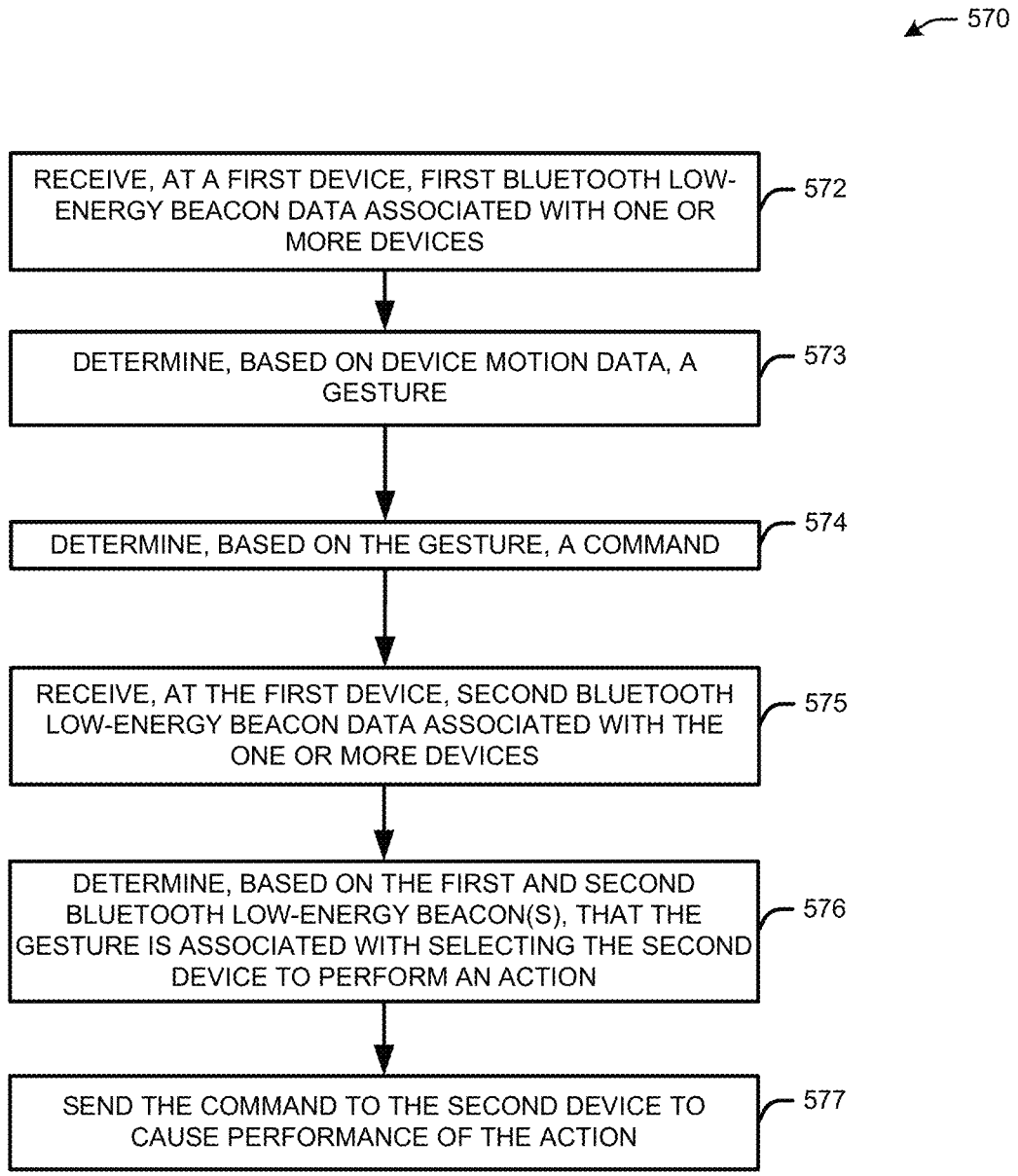
FIG. 5D illustrates a flow diagram for a process for gesture-based selection of devices, in accordance with one or more example embodiments of the present disclosure.

FIG. 5D illustrates an example flow diagram for a process 570 for gesture-based selection of devices, in accordance with one or more example embodiments of the present disclosure.

At block 572, a device (e.g., the one or more devices 302 of FIG. 3, the remote network 332 of FIG. 3) may receive first BLE beacon data (e.g., the wireless communications 154 and the wireless communications 158 of FIG. 2A, the data 310 of FIG. 3, or indications of the wireless communications 154 and/or the wireless communications 158 as provided in the data 330 of FIG. 3) from one or more other devices (e.g., the one or more devices 312 of FIG. 3). The data from the BLE beacons or other wireless communications may be indicative of transmission and/or reception angles that the device may use to determine respective distances and/or directions between the device and the one or more other devices. For example, the BLE beacons may include transmission timing data, allowing the device to determine the time-of-flight between the device and the one or more other devices. The first BLE beacon data may be received before the device is used to perform a gesture and/or before the device detects a voice input (e.g., the voice input 122 of FIG. 1). The first BLE beacon data may be received in response to polling frames and/or probe requests sent by the device to the one or more other devices.

At block 573, the device may determine, based on device motion data (e.g., accelerometer data of the device or received from another device) a gesture indicated by the motion data. The motion data may be used to determine an action or hand motion being performed by a user of the device. For example, motion data may be compared to stored motion profiles that are associated with certain hand motions or gestures. For example, first motion data may correspond to a motion profile that is associated with a motion of pointing, second motion data may correspond to a motion profile that is associated with a hand motion of waving, and so forth. Computer-executable instructions stored on a memory of the device or the third device may be executed to determine a first action associated with motion data. For example, one or more modules (e.g., the one or more gesture modules 336 of FIG. 3) may determine a first action associated with the motion data. In some embodiments, the device or the third device may process motion data and determine the occurrence of a certain motion or event, and may subsequently determine an action associated with the motion data. The action may be a selection of the second device to perform one or more actions.

At block 574, the device may determine, based on the gesture, a command. In the absence of a voice command or other type of command that is separate from the gesture, the gesture may represent both a command and the device that a user intends to control with the command. For example, the user may clap or point to a light, which may perform limited corresponding actions, such as to turn on or off. A device may detect the gesture, determine that the gesture corresponds to an action and a device, and may cause the device to perform the action. For example, the device may identify that a gesture is made in the direction of a device (e.g., by pointing to the device), and may determine that the device may perform only one function (e.g., changing a power state from on to off or off to on). Alternatively, the device may identify the most recent command provided by the user, and may determine that the latest gesture corresponds to the same device controlled by the most recent command (e.g., when the most recent command was received within a threshold amount of time so as to be recent).

At block 575, the device may receive second BLE beacon data or other data from wireless transmissions from the one or more other devices. The device may request the second BLE beacons in response to detection of the gesture or detection that a gesture mode has been initiated (e.g., by touching the button 120 of FIG. 1), or the second BLE beacon data may be received without prompting. The BLE beacon data or other wireless communications may be indicative of transmission and/or reception angles that the device may use to determine respective distances and/or directions between the device and the one or more other devices. For example, the BLE beacon data may include transmission timing data, allowing the device to determine the time-of-flight between the device and the one or more other devices. The second BLE beacon data may be received during or after the device is used to perform a gesture and/or after the device detects a voice input (e.g., the voice input 122 of FIG. 1).

At block 576, the device may the device may determine, based on the first and second BLE beacon data, that the gesture is associated with selecting the second device to perform the action associated with the command. For example, the device that is nearest to the device after or during the gesture may be the selected device to perform the action. Alternatively, the device may determine a difference between the pre-gesture and post-gesture (or during gesture) distances between the device the one or more additional devices. When one of the differences indicates that one of the one or more additional devices is closer after/during the gesture than before the gesture, that device may be the device selected by the gesture to perform the command. The transmission and/or reception angle of the BLE beacons between the device and the second device may not have changed from the first BLE beacons to the second BLE beacons, or may have changed less than the angle changes of other devices of the one or more additional devices, thereby indicating that the gesture is aimed at (e.g., pointed or waived to) the second device.

At block 577, the device may send the command or an indication of the command to the second device to indicate to the second device to perform the command. The command may be sent to the second device from the device, or may be sent to the second device by first sending the command to another device to provide to the second device. Alternatively, another device may send the command to the second device.

Figure 5E:
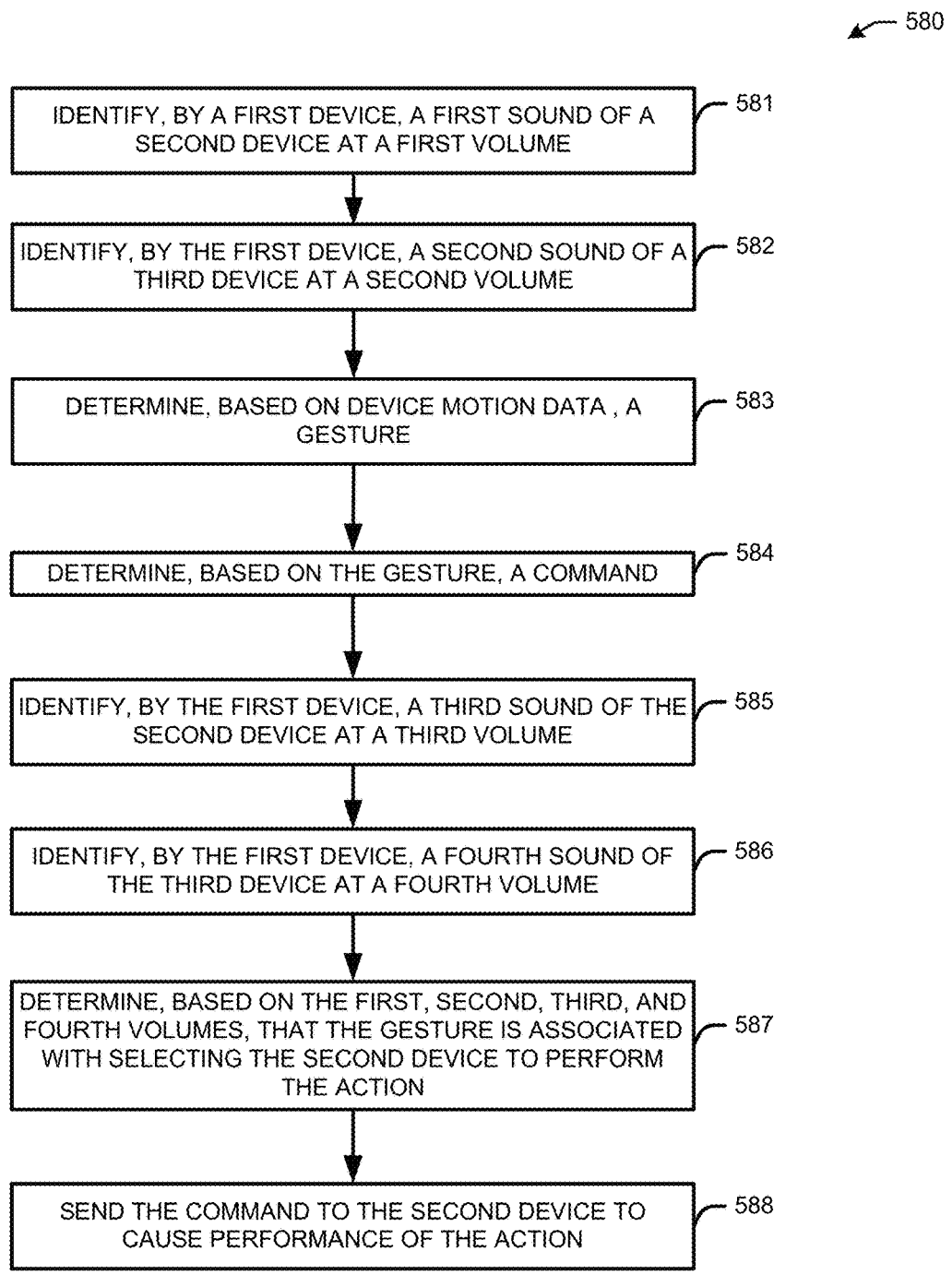
FIG. 5E illustrates a flow diagram for a process for gesture-based selection of devices, in accordance with one or more example embodiments of the present disclosure.

FIG. 5E illustrates an example flow diagram for a process 580 for gesture-based selection of devices, in accordance with one or more example embodiments of the present disclosure.

At block 581, a device (e.g., the one or more devices 302 of FIG. 3, the remote network 332 of FIG. 3) may identify a first sound (e.g., waveform data) of a second device (e.g., of the one or more devices 312 of FIG. 3) at a first volume or intensity. At block 582, the device may identify a second sound (e.g., waveform data) of a third device at a second volume or intensity. The second and third devices may play sounds or otherwise transmit waveforms at frequencies that device users may not be able to hear, but that the device may be able to identify (e.g., using a microphone), or that the device may receive from another device (e.g., using the data 330 of FIG. 3). The sounds/waveforms may be used in place of BLE beacons or other wireless communications that may be used to indicate distance between devices (e.g., based on time-of-flight calculations) and/or angles/directions between devices.

At block 583, the device may determine, based on device motion data (e.g., detected by the device or received as data from another device), a gesture. The motion data may be used to determine an action or hand motion being performed by a user of the device. For example, detected or determined motion data may be compared to stored motion profiles that are associated with certain hand motions or gestures. For example, first motion data may correspond to a motion profile that is associated with a motion of pointing, second motion data may correspond to a motion profile that is associated with a hand motion of waving, and so forth. Computer-executable instructions stored on a memory of the device or the third device may be executed to determine a first action associated with motion data. For example, one or more modules (e.g., the one or more gesture modules 336 of FIG. 3) may determine a first action associated with the motion data. In some embodiments, the device or the third device may process motion data and determine the occurrence of a certain motion or event, and may subsequently determine an action associated with the motion data. The action may be a selection of the second device to perform one or more actions.

At block 584, the device may determine a command based on the gesture. In the absence of a voice command or other type of command that is separate from a gesture, the gesture may represent both a command and the device that a user intends to control with the command. For example, the user may clap or point to a light, which may perform limited corresponding actions, such as to turn on or off. A device may detect the gesture, determine that the gesture corresponds to an action and a device, and may cause the device to perform the action. For example, the device may identify that a gesture is made in the direction of a device (e.g., by pointing to the device), and may determine that the device may perform only one function (e.g., changing a power state from on to off or off to on). Alternatively, the device may identify the most recent command provided by the user, and may determine that the latest gesture corresponds to the same device controlled by the most recent command (e.g., when the most recent command was received within a threshold amount of time so as to be recent).

At block 585, the device may identify a third sound (e.g., waveform data) of the second device (e.g., of the one or more devices 312 of FIG. 3) at a third volume or intensity. At block 586, the device may identify a fourth sound (e.g., waveform data) of the third device at a fourth volume or intensity. The second and third devices may play sounds at frequencies that device users may not be able to hear, but that the device may be able to identify (e.g., using a microphone), or that the device may receive from another device (e.g., using the data 330 of FIG. 3). The sounds may be used in place of BLE beacons or other wireless communications that may be used to indicate distance between devices (e.g., based on time-of-flight calculations) and/or angles/directions between devices. The first and second sounds may be presented before a gesture and/or voice command, and the third and fourth sounds may be presented after or during a gesture.

At block 587, the device may determine based on the first, second, third, and fourth volumes or intensities, that the gesture is associated with selecting the second device to perform the action associated with the command. The device may determine the volume of such sounds before and after a gesture. The sound presented by the second device selected by the gesture may increase (e.g., compared to before the gesture) because, for example, the device may be closer to the second device after the gesture (e.g., because the device user pointed to the selected device).

At block 588, the device may send the command or an indication of the command to the second device to indicate to the second device to perform the command. The command may be sent to the second device from the device, or may be sent to the second device by first sending the command to another device to provide to the second device. Alternatively, another device may send the command to the second device.

Figure 5F:
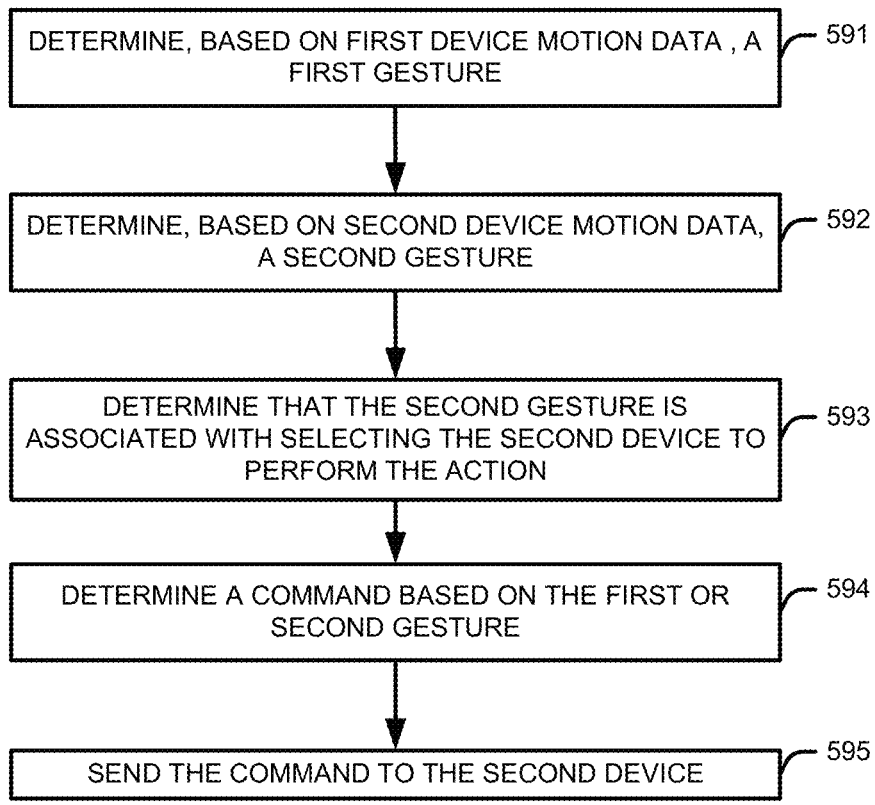
FIG. 5F illustrates a flow diagram for a process for gesture-based selection of devices, in accordance with one or more example embodiments of the present disclosure.

FIG. 5F illustrates an example flow diagram for a process 590 for gesture-based selection of devices, in accordance with one or more example embodiments of the present disclosure.

At block 591, a device (e.g., the one or more devices 302 of FIG. 3, the remote network 332 of FIG. 3) may identify first motion data (e.g., accelerometer data detected by the device or received from another device), and may determine, based on the first motion data, a first gesture. At block 592, the device may identify second motion data (e.g., accelerometer data detected by the device or received from another device), and may determine, based on the second motion data, a second gesture. At block 593, the device may determine that the second gesture is associated with selecting a second device to perform the action. The first gesture may correspond to a device selection mode, and the second gesture may correspond to swipes or other motions indicating a virtual scrolling through available devices to perform the action. For example, each motion may correspond to a hand waive that effectively "swipes" a virtual selector from one device to another (e.g., the available devices for performing the action) until the user stops the gestures (e.g., ends the device selection mode). For example, the gesturing device may be used to swipe up, down, left, right, etc., which each gesture corresponding to a selection of an available device until the user stops performing such gestures, resulting in the last selected device based on the gestures as the device to perform the one or more actions.

At block 594, the device may determine a command based on the first and/or second gesture. In the absence of a voice command or other type of command that is separate from a gesture, the gesture may represent both a command and the device that a user intends to control with the command. For example, the user may clap or point to a light, which may perform limited corresponding actions, such as to turn on or off. A device may detect the gesture, determine that the gesture corresponds to an action and a device, and may cause the device to perform the action. For example, the device may identify that a gesture is made in the direction of a device (e.g., by pointing to the device), and may determine that the device may perform only one function (e.g., changing a power state from on to off or off to on). Alternatively, the device may identify the most recent command provided by the user, and may determine that the latest gesture corresponds to the same device controlled by the most recent command (e.g., when the most recent command was received within a threshold amount of time so as to be recent).

At block 595, the device may send the command or an indication of the command to the second device to indicate to the second device to perform the command. The command may be sent to the second device from the device, or may be sent to the second device by first sending the command to another device to provide to the second device. Alternatively, another device may send the command to the second device.

The descriptions herein are not meant to be limiting.

Figure 6:
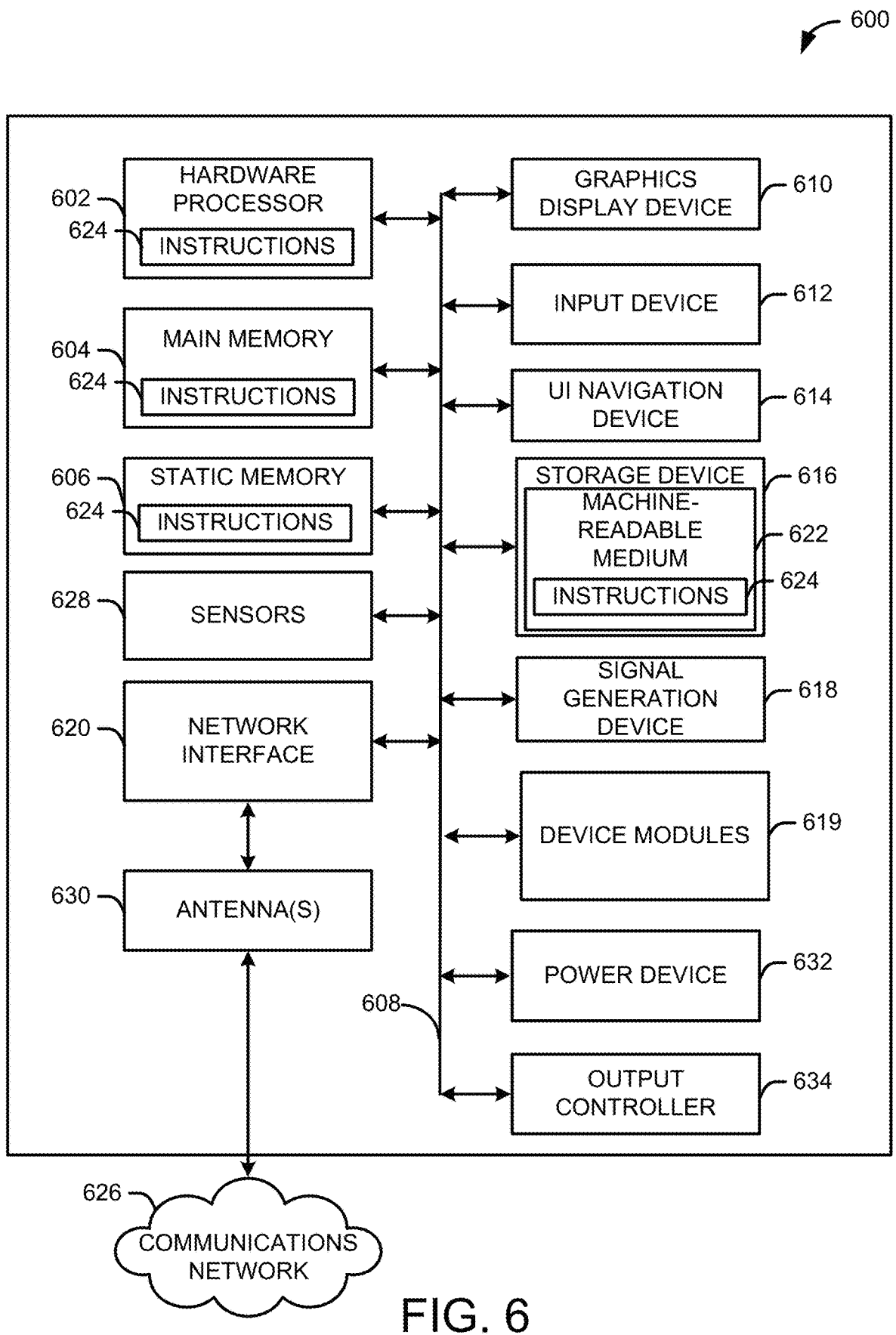
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the ring device 104 of FIG. 1, the watch device 106, the smartphone device 108, the display device 110, the stereo speakers 112, the cable box 114, the game console 116, and/or the streaming media device 118 of FIG. 1, the one or more devices 302, the one or more devices 312, and/or the remote network 332 of FIG. 3, the device 404 and/or the light devices 408-420 of FIG. 4A, the device 454, the device 458, the device 460, and/or the device 462 of FIG. 4B) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, one or more device modules 619 (e.g., the modules FIG. 3 implemented in a remote network and/or at a client device), a network interface device/transceiver 620 coupled to antenna(s) 630, and one or more sensors 628, such as a microphone, a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, Bluetooth technical standards, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
   receiving, by at least one processor of a first device, first Bluetooth low-energy (BLE) beacon data from a second device, the first BLE beacon data indicative of a first distance between a third device and the second device and a first direction between the third device and the second device;
   receiving, by the at least one processor, second BLE beacon data from the second device, the second BLE beacon data indicative of a second distance between the second device and a fourth device and a second direction between the second device and the fourth device;
   receiving, by the at least one processor, voice data associated with selecting the third device to perform an action;
   identifying, by the at least one processor, device motion data;
   determining, by the at least one processor and based on the device motion data, a gesture;
   receiving, by the at least one processor, third BLE beacon data from the second device, the third BLE beacon data indicative of a third distance between the second device and the third device and a third direction between the second device and the third device;
   receiving, by the at least one processor, fourth BLE beacon data from the second device, the fourth BLE beacon data indicative of a fourth distance between the second device and the fourth device and a fourth direction between the second device and the fourth device;
determining, by the at least one processor, a command based on the voice data;
determining, by the at least one processor, that at least one of the first distance is greater than the third distance or the first direction is the same as the third direction;
determining, by the at least one processor and based on the determination that at least one of the first distance is greater than the third distance or the first direction is the same as the third direction, that the gesture is associated with selecting the third device to perform the action; and
sending, by the at least one processor, the command to the third device.

2. The method of claim 1, further comprising:
identifying first waveform data associated with the third device, the first waveform data having a first intensity;
identifying second waveform data associated with the fourth device, the second waveform data having a second intensity;
receiving second device motion data;
determining, based on the second device motion data, a second gesture;
identifying third waveform data associated with the third device, the third waveform data having a third intensity;
identifying a fourth waveform data associated with the fourth device, the fourth waveform data having a fourth intensity;
determining that the third intensity is greater than the first intensity;
determining, based on the determination that the third intensity is greater than the first intensity, that the second gesture is associated with selecting the third device to perform a second action; and
sending a second command to the third device, the second command associated with causing the third device to perform the second action.

3. The method of claim 1, further comprising:
receiving second device motion data;
determining, based on the second device motion data, a second gesture;
receiving third device motion data;
determining, based on the third device motion data, that the second gesture is associated with selecting the third device to perform a second action; and
sending a second command to the third device, the second command associated with causing the third device to perform the second action.

4. A method, comprising:
identifying, by at least one processor of a first device, device motion data;
determining, by the at least one processor and based on the device motion data, a gesture;
receiving, by the at least one processor, a first indicator of a second device, the first indicator indicative of a first distance between the first device or a third device to the second device and a first direction between the first device or the third device to the second device;
receiving, by the at least one processor, a second indicator of the second device, the second indicator indicative of a second distance between the first device or the third device to the second device and a second direction between the first device or the third device to the second device;
receiving, by the at least one processor, a third indicator of a fourth device, the third indicator indicative of a third distance between the first device or the third device to the fourth device and a third direction between the first device or the third device to the fourth device;
receiving, by the at least one processor, a fourth indicator of the third device, the fourth indicator indicative of a fourth distance between the first device or the third device to the fourth device and a fourth direction between the first device or the third device to the fourth device;
determining, by the at least one processor, based on the first distance, the first direction, the second distance, and the second direction, that the gesture is associated with selecting the second device to perform an action; and
sending, by the at least one processor, a command, the command associated with causing the second device to perform the action.

5. The method of claim 4, wherein the first indicator comprises Bluetooth low-energy (BLE) beacon data associated with the second device, the BLE beacon data indicative of the first distance between and the first direction.

6. The method of claim 4, further comprising determining, based on the first indicator, the first distance and the first direction.

7. The method of claim 4, further comprising:
determining that at least one of the first distance is greater than the second distance or the first direction is the same as the second direction,
wherein determining that the gesture is associated with selecting the second device to perform the action is based on the determination that at least one of the first distance is greater than the second distance or the first direction is the same as the second direction.

8. The method of claim 4, further comprising:
receiving voice data associated with the command;
determining the command based on the voice data; and
determining that the command is associated with the gesture, wherein sending the command is based on the determination that the command is associated with the gesture.

9. The method of claim 4, further comprising:
sending a polling frame, wherein the first indicator is received in response to the polling frame,
and
wherein the second indicator is received in response to the polling frame.

10. The method of claim 4, wherein the device motion data is first motion data associated with the third device, the method further comprising:
identifying first waveform data associated with the second device, the first waveform data having a first intensity;
identifying second waveform data associated with the fourth device, the second waveform data having a second intensity;
receiving second device motion data associated with the third device;
determining, based on the second device motion data, a second gesture;
identifying third waveform data associated with the second device, the third waveform data having a third intensity;
identifying fourth waveform data associated with the fourth device, the fourth waveform data having a fourth intensity;

determining that the third intensity is greater than the first intensity;

determining, based on the determination that the third intensity is greater than the first intensity, that the second gesture is associated with selecting the second device to perform a second action; and sending a second command to the second device, the second command associated with causing the second device to perform the second action.

11. The method of claim 4, wherein the device motion data is first motion data associated with the third device, the method further comprising:

receiving second device motion data associated with the third device;

determining, based on the second device motion data, a second gesture;

receiving third motion data associated with the third device;

determining, based on the third device motion data, that the second gesture is associated with selecting the second device to perform a second action; and sending a second command to the second device, the second command associated with causing the second device to perform the second action.

12. The method of claim 4, wherein the device motion data is first motion data associated with the third device, the method further comprising:

receiving second motion data associated with the fourth device, the second motion data indicative of a second gesture associated with the fourth device; and determining a priority associated with the third device and the fourth device, wherein sending the command is based on determining the priority.

13. The method of claim 4, wherein the action is one of the following:

powering on or off the second device, or presenting content using the second device.

14. A device comprising memory coupled to at least one processor, the at least one processor configured to:

identify device motion data;

determine, based on the device motion data, a gesture;

receive a first indicator of a second device, the first indicator indicative of a first distance between the first device or a third device to the second device and a first direction between the first device or the third device to the second device;

receive a second indicator of the second device, the second indicator indicative of a second distance between the first device or the third device to the second device and a second direction between the first device or the third device to the second device;

receive a third indicator of a fourth device, the third indicator indicative of a third distance between the first device or the third device to the fourth device and a third direction between the first device or the third device to the fourth device;

receive a fourth indicator of the third device, the fourth indicator indicative of a fourth distance between the first device or the third device to the fourth device and a fourth direction between the first device or the third device to the fourth device;

determine, based on the first distance, the first direction, the second distance, and the second direction, that the gesture is associated with selecting the second device to perform an action; and send a command to the second device, the command associated with causing the second device to perform the action.

15. The device of claim 14, wherein the first indicator comprises Bluetooth low-energy (BLE) beacon data associated with the second device, the BLE beacon data indicative of the first distance and the first direction.

16. The device of claim 14, wherein the at least one processor is further configured to determine, based on the first indicator, the first distance and the first direction.

17. The device of claim 14, wherein the at least one processor is further configured to:

receive voice data associated with the command;

determine the command based on the voice data; and determine that the command is associated with the gesture, wherein to send the command is based on the determination that the command is associated with the gesture.

18. The method of claim 4, wherein the first indicator is received at a first time, the indicator distance is received at a second time after the first time, the third indicator is received at a third time, and the fourth indicator is received at a fourth time after the third time.

19. The method of claim 18, further comprising:

determining that the second distance at the second time is less than the first distance at the first time; and determining that the fourth distance at the fourth time is greater than the third distance at the third time.

20. The device of claim 14, wherein the first indicator is received at a first time, the indicator distance is received at a second time after the first time, the third indicator is received at a third time, and the fourth indicator is received at a fourth time after the third time.

* * * * *